(12) United States Patent
Pröll

(10) Patent No.: US 12,548,823 B2
(45) Date of Patent: Feb. 10, 2026

(54) CELL COOLING COVER FOR A BATTERY MODULE

(71) Applicant: SAMSUNG SDI CO., LTD., Yongin-si (KR)

(72) Inventor: Andreas Pröll, Helfenberg (AT)

(73) Assignee: Samsung SDI Co., Ltd., Yongin-si (KR)

( * ) Notice: Subject to any disclaimer, the term of this patent is extended or adjusted under 35 U.S.C. 154(b) by 634 days.

(21) Appl. No.: 17/959,175

(22) Filed: Oct. 3, 2022

(65) Prior Publication Data
US 2023/0216106 A1    Jul. 6, 2023

Related U.S. Application Data

(60) Provisional application No. 63/252,305, filed on Oct. 5, 2021.

(30) Foreign Application Priority Data

Mar. 10, 2022  (EP) ..................................... 22161425

(51) Int. Cl.
*H01M 10/6556*    (2014.01)
*H01M 10/613*    (2014.01)
(Continued)

(52) U.S. Cl.
CPC ..... *H01M 10/6556* (2015.04); *H01M 10/613* (2015.04); *H01M 10/625* (2015.04);
(Continued)

(58) Field of Classification Search
CPC ........... H01M 10/6556; H01M 10/613; H01M 10/625; H01M 10/6568; H01M 10/6554;
(Continued)

(56) References Cited

U.S. PATENT DOCUMENTS

2016/0359206 A1* 12/2016 Eberleh ............... H01M 10/425
2017/0077566 A1*  3/2017 Mascianica ....... H01M 10/6556
(Continued)

FOREIGN PATENT DOCUMENTS

CN      106207042 A    12/2016
CN      212810495 U     3/2021
(Continued)

OTHER PUBLICATIONS

Extended European Search Report issued in corresponding EP Application No. 22161425.8, dated Sep. 28, 2023, 9 pages.

*Primary Examiner* — Matthew W Van Oudenaren
(74) *Attorney, Agent, or Firm* — Womble Bond Dickinson (US) LLP

(57) ABSTRACT

The present disclosure provides a cell cooling cover for covering and fluid-cooling a battery module. The cell cooling cover includes: a cover plate and a channel system fixedly arranged at the cover plate. The channel system including a plurality of main channels configured to guide a coolant. The main channels are arranged such that two of the main channels extend along a stack of battery cells. The two main channels are positioned in the area of the terminal sides of the battery cells, and the venting outlets of the battery cells are arranged between the two main channels.

18 Claims, 5 Drawing Sheets

(51) Int. Cl.
*H01M 10/625* (2014.01)
*H01M 10/6568* (2014.01)
*H01M 50/209* (2021.01)
*H01M 50/271* (2021.01)

(52) U.S. Cl.
CPC ..... *H01M 10/6568* (2015.04); *H01M 50/209* (2021.01); *H01M 50/271* (2021.01)

(58) Field of Classification Search
CPC ........... H01M 10/6563; H01M 10/647; H01M 10/6557; H01M 10/6566; H01M 10/6567; H01M 10/617; H01M 10/627; H01M 10/653; H01M 10/6565; H01M 2220/20; H01M 50/209; H01M 50/271; H01M 50/358; H01M 50/24; H01M 50/249; H01M 50/147; H01M 50/148; H01M 50/15; H01M 50/164; H01M 50/231; H01M 50/282
See application file for complete search history.

(56) References Cited

U.S. PATENT DOCUMENTS

| 2018/0026243 | A1 | 1/2018 | Stojanovic et al. |
| 2020/0212526 | A1* | 7/2020 | Wu ........................ H01M 50/30 |
| 2021/0296721 | A1 | 9/2021 | Omura et al. |
| 2022/0021070 | A1* | 1/2022 | Yang ................. H01M 10/6554 |
| 2022/0209333 | A1 | 6/2022 | Huang et al. |
| 2022/0328901 | A1 | 10/2022 | Yang et al. |

FOREIGN PATENT DOCUMENTS

| CN | 214013020 | * | 8/2021 |
| CN | 214013020 U | | 8/2021 |
| DE | 10 2017 212 223 A1 | | 1/2019 |
| EP | 3 273 500 A1 | | 1/2018 |
| EP | 3 675 218 A1 | | 7/2020 |
| WO | WO 2021/057280 A1 | | 4/2021 |
| WO | WO 2021/164392 A1 | | 8/2021 |

* cited by examiner

CELL COOLING COVER FOR A BATTERY MODULE

CROSS-REFERENCE TO RELATED APPLICATIONS

This application claims priority to and the benefit of U.S. Provisional Application No. 63/252,305, filed in the United States Patent and Trademark Office on Oct. 5, 2021, and European Patent Application No. 22161425.8, filed in the European Patent Office on Mar. 10, 2022, the entire contents of both of which are incorporated herein by reference.

BACKGROUND

1. Field

Aspects of embodiments of the present disclosure relate to a cell cooling cover for a battery module.

2. Description of the Related Art

Recently, vehicles for transportation of goods and peoples have been developed that use electric power as a source for motion. Such an electric vehicle is an automobile that is propelled by an electric motor using energy stored in rechargeable (or secondary) batteries. An electric vehicle may be solely powered by batteries or may be a hybrid vehicle powered by, for example, a gasoline generator. Furthermore, the vehicle may include a combination of an electric motor and a conventional combustion engine.

Generally, an electric-vehicle battery (EVB, or traction battery) is a battery used to power the propulsion of battery electric vehicles (BEVs). Electric-vehicle batteries differ from starting, lighting, and ignition batteries in that they are designed to provide power for sustained periods of time. A rechargeable (or secondary) battery differs from a primary battery in that it is designed to be repeatedly charged and discharged, while the latter provides an irreversible conversion of chemical to electrical energy. Low-capacity rechargeable batteries are used as power supply for small electronic devices, such as cellular phones, notebook computers, and camcorders, while high-capacity rechargeable batteries are used as power supply for hybrid vehicles and the like.

Generally, rechargeable batteries include an electrode assembly including a positive electrode, a negative electrode, and a separator interposed between the positive and negative electrodes, a case receiving (or accommodating) the electrode assembly, and an electrode terminal electrically connected to the electrode assembly. An electrolyte solution is injected into the case to enable charging and discharging of the battery via an electrochemical reaction of the positive electrode, the negative electrode, and the electrolyte solution. The shape of the case, such as cylindrical or rectangular, may be selected based on the battery's intended purpose. Lithium-ion (and similar lithium polymer) batteries, widely known via their use in laptops and consumer electronics, dominate the most recent group of electric vehicles in development.

Rechargeable batteries may be used as a battery module formed of a plurality of unit battery cells coupled to each other in series and/or in parallel to provide a high energy density, such as for motor driving of a hybrid vehicle. For example, the battery module may be formed by interconnecting the electrode terminals of the plurality of unit battery cells in an arrangement or configuration depending on a desired amount of power and to realize a high-power rechargeable battery.

Battery modules can be constructed in either a block design or a modular design. In the block design, each battery is coupled to a common current collector structure and a common battery management system, and the unit thereof is arranged in a housing. In the modular design, pluralities of battery cells are connected to form submodules, and several submodules are connected to form the battery module. In automotive applications, battery systems often consist of a plurality of battery modules connected to each other in series to provide a desired voltage. The battery modules may include submodules with a plurality of stacked battery cells, and each stack may include cells connected in parallel that are, in turn, connected in series (XpYs) or cells connected in series that are, in turn, connected in parallel (XsYp).

A battery pack is a set of any number of (often identical) battery modules. They may be configured in a series, parallel or a mixture of both to deliver the desired voltage, capacity, or power density. Battery packs include the individual battery modules and the interconnects, which provide electrical conductivity between them.

The mechanical integration of such a battery pack includes appropriate mechanical connections between the individual components (e.g., within battery modules and between them and a supporting structure of the vehicle). These connections should remain functional and safe throughout the average service life of the battery system. Further, installation space and interchangeability requirements must be met, especially in mobile applications.

Mechanical integration of battery modules may be achieved by providing a carrier framework and by positioning the battery modules thereon. Fixing the battery cells (or battery modules) may be achieved by, for example, fitted depressions in the framework or by mechanical interconnectors, such as bolts or screws. In some cases, the battery modules are confined by fastening side plates to lateral sides of the carrier framework. Further, cover plates may be fixed atop and below the battery modules.

The carrier framework of the battery pack is mounted to a carrying structure of the vehicle. When the battery pack is to be fixed at the bottom of the vehicle, the mechanical connection may be established from the bottom side by, for example, bolts passing through the carrier framework of the battery pack. The framework is often made of aluminum or an aluminum alloy to lower the total weight of the construction.

Battery systems, according to the related art, despite any modular structure, usually include a battery housing that acts as an enclosure to seal the battery system against the environment and provides structural protection of the battery system's components. Housed battery systems are generally mounted as a whole into their application environment, such as an electric vehicle. Thus, the replacement of defective system parts, such as a defect battery submodule, requires dismounting the whole battery system and removal of the housing first. Even small defects or the replacement of cheap system parts might require dismounting and replacement of the entire battery system and its separate repair. Because high-capacity battery systems are expensive, large, and heavy, such a procedure is burdensome and the storage, such as in the mechanic's workshop, of the bulky battery systems is difficult.

An active or passive thermal management system is employed to safely use the at least one battery module by efficiently emitting, discharging and/or dissipating heat generated from its rechargeable batteries to provide thermal control of the battery pack. If the heat emission/discharge/dissipation is not sufficiently performed, temperature deviations occur between respective battery cells such that the battery module may no longer generate a desired (or designed) amount of power. In addition, an increase of the internal temperature can lead to abnormal reactions occurring therein, and thus, charging and discharging performance of the rechargeable deteriorates and the life-span of the rechargeable battery is shortened. Thus, cell cooling is employed for effectively emitting/discharging/dissipating heat from the cells.

The thermal management system may be controlled by a battery management system (BMS) or a battery management unit (BMU). Generally, the BMS/BMU is provided for managing the battery module or battery pack, such as by protecting the battery from operating outside its safe operating area (or safe operating parameters), monitoring its state (e.g., its thermal state), calculating secondary data, reporting that data, controlling its environment, authenticating it, and/or balancing it.

Exothermic decomposition of cell components may lead to a so-called thermal runaway. Generally, thermal runaway describes a process that is accelerated by increased temperature, in turn releasing energy that further increases temperature. Thermal runaway occurs in situations where an increase in temperature changes the conditions in a way that causes a further increase in temperature, often leading to a destructive result. In rechargeable battery systems, thermal runaway is associated with strongly exothermic reactions that are accelerated by temperature rise. These exothermic reactions include combustion of flammable gas compositions within the battery pack housing. For example, when a cell is heated above a critical temperature (typically above about 150° C.), it can transition into a thermal runaway. The initial heating may be caused by a local failure, such as a cell internal short circuit, heating from a defective electrical contact, short circuiting with a neighboring cell. During the thermal runaway, a failed battery cell, that is, a battery cell which has a local failure, may reach a temperature exceeding about 700° C. Further, large quantities of hot gas are ejected from inside of the failed battery cell through the venting opening in the cell housing into the battery pack. The main components of the vented gas are $H_2$, $CO_2$, CO, electrolyte vapor, and other hydrocarbons. The vented gas is therefore flammable and potentially toxic. The vented gas also causes a gas-pressure to increase inside the battery pack.

Battery modules and/or battery packs, according to the related art, often have a number of disadvantages, such as: electrical harnesses of the battery module/pack (e.g., terminals, busbars etc.) that are contaminated with particles (e.g., graphite particles) from vent gas ejected (or emitted) from the battery cells during a thermal event (e.g., a thermal run-away); deflagration of vent gas ejected from the battery cells during a thermal event; melt-down of the top surfaces of at least some of the battery cells due to the heat generated from vent gases; and hot areas of battery cells affected by a thermal event not being cooled and, thus, further driving the thermal event occurring inside the cell.

SUMMARY

According to embodiments of the present disclosure, at least the above-described drawbacks of the related art are overcome and/or mitigated and a battery pack having improved characteristics in this regard is provided.

The present disclosure is defined by the appended claims and their equivalents. Any disclosure lying outside the scope of the claims and their equivalents is intended for illustrative as well as comparative purposes.

According to a first embodiment of the present disclosure, a cell cooling cover is provided. The cell cooling cover is configured to cover and fluid-cool a battery module by bringing the cell cooling cover into position relative to the battery module. The battery module includes at least one stack of battery cells, and each of the battery cells has a first side having an (essentially) planar shape. The first sides face into the same direction and extending along one virtual plane. Each of the first sides has a venting outlet. The cell cooling cover includes: a cover plate configured to cover the entirety of the first sides of the battery cells in the battery module when the cell cooling cover is in position relative to the battery module; and a channel system fixedly arranged at the cover plate. The channel system includes a plurality of main channels, and each of the main channels is configured to guide a coolant. The main channels are arranged such that, when the cell cooling cover is in position relative to the battery module, for each of the stacks: the main channels extend each along that stack; and, when viewed in a direction perpendicular to the first sides, the main channels are each positioned in the area of the first sides of the battery cells of this stack and the venting outlets of the battery cells of this stack are each arranged between the main channels.

According to a second embodiment of the present disclosure, a covered battery module is provided. The covered battery module includes: a cell cooling cover as described above and a battery module including at least one stack of battery cells. Each of the battery cells has a first side having an (essentially) planar shape, and all of the first sides face in the same direction and extend along one virtual plane. Each of the first sides has a venting outlet, and the cell cooling cover is attached to the battery module in position relative to the battery module.

According to a third embodiment of the present disclosure, a battery pack including a plurality of covered battery modules as described above is provided. The covered battery modules are arranged as a pile (or stack) in that, except for a first one of the covered battery modules forming a base of the pile, each of the covered battery modules is arranged on cell cooling cover of another covered battery module.

According to a fourth embodiment of the present disclosure, a vehicle is provided. The vehicle includes at least one covered battery module as described above and/or at least one battery pack as described above.

Further aspects and features of the present disclosure can be learned from the dependent claims and the following description.

BRIEF DESCRIPTION OF THE DRAWINGS

Aspects and features of the present disclosure will become apparent to those of ordinary skill in the art by describing, in detail, embodiments thereof with reference to the attached drawings, in which.

DETAILED DESCRIPTION

Figure 1A:
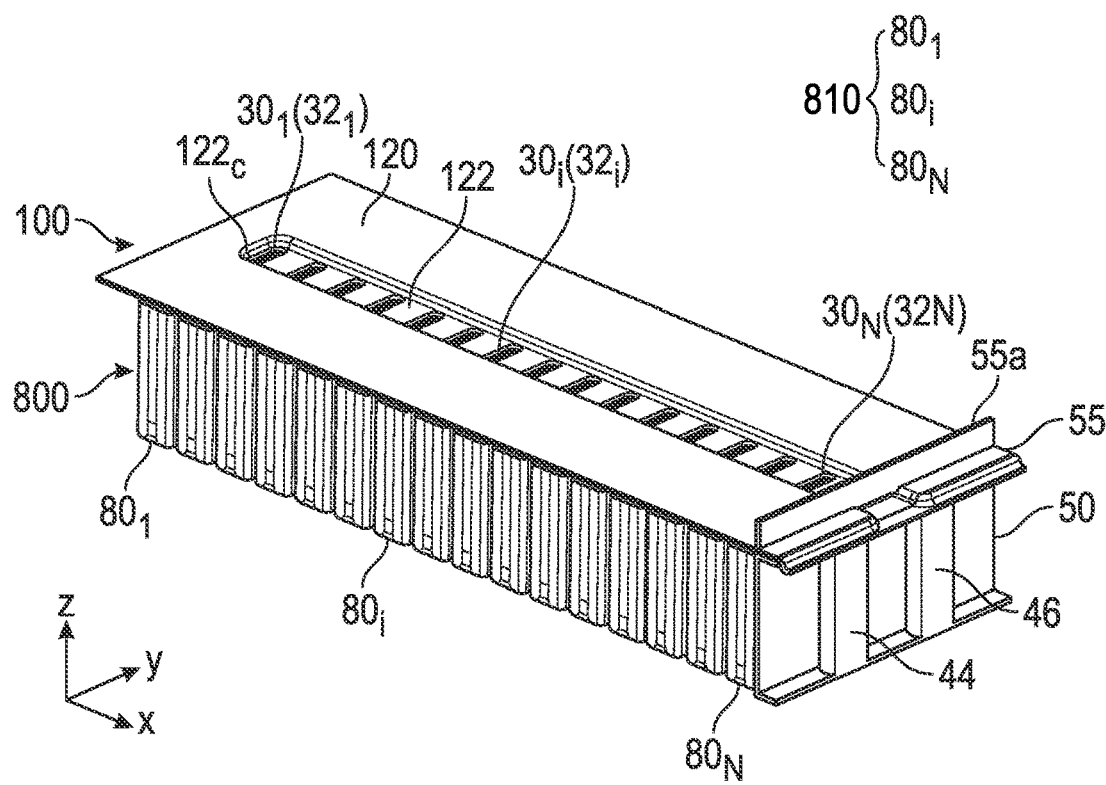
FIG. 1A is a perspective view schematically illustrating a covered battery module according to an embodiment of the present disclosure.

Reference will now be made, in detail, to embodiments of the present disclosure, examples of which are illustrated in the accompanying drawings. Aspects and features of the embodiments, and implementation methods thereof, will be described with reference to the accompanying drawings. In the drawings, like reference numerals denote like elements, and redundant descriptions thereof may be omitted. The present disclosure, however, may be embodied in various different forms, and should not be construed as being limited to the embodiments illustrated herein. Rather, these embodiments are provided as examples so that this disclosure will be thorough and complete and will fully convey the aspects and features of the present disclosure to those skilled in the art.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

A first embodiment of the present disclosure relates to a cell cooling cover for covering and fluid-cooling a battery module by bringing the cell cooling cover into a position (e.g., a predefined position) relative to the battery module. The battery module, which may not be considered part of the cell cooling cover, includes at least one stack of battery cells. Each of the battery cells has a first side with an essentially planar shape. All first sides face in the same direction and extend along one virtual plane. Each of the first sides has a venting outlet. The cell cooling cover includes a cover plate configured to cover the entirety of the first sides of the battery cells of the battery module when the cell cooling cover is brought into position (e.g., the predefined position) relative to the battery module and a channel system fixedly arranged at the cover plate. The channel system has a plurality of main channels. Each of the main channels is configured to guide a coolant. The main channels are arranged such that, when the cell cooling cover is in the predefined position relative to the battery module, for each of the stacks: two of the main channels extend each along that stack, and, when viewed in a direction perpendicular to the first sides: these two main channels are each positioned in the area of the predefined sides of the battery cells of this stack, and the venting outlets of the battery cells of this stack are each arranged between these two main channels.

According to embodiments of the cell cooling cover, the channel system is fixedly arranged on one side of the cover plate or in the cover plate.

In the following, the "cell cooling cover" may be referred to as the "cell cover." Further, the expression "coolant" is interchangeable with a "cooling fluid." Also, instead of "battery cell", the term "cell" may be used.

In one embodiment of the cell cooling cover, for each of the battery cells, the first side is a terminal side. A first terminal and a second terminal are arranged on each of the terminal sides. For each of the battery cells, the venting outlet is arranged between the first terminal and the second terminal. Further, for each pair of a first main channel and a second main channel extending along the stack of battery cells, when the cell cover is brought into position relative to the battery module, the first main channel runs between the first terminals of the battery cells of this stack and the venting outlets of the battery cells of this stack, and the second main channel runs between the venting outlets of the battery cells of this stack and the second terminals of the battery cells of this stack.

The cell cooling cover, according to the first embodiment, separates the venting gas from the electrical circuitry to prevent electrically conductive paths through deposition of graphite and metal contaminants and cools the venting gas to prevent deflagration at the outlet of the battery housing.

Furthermore, the cell cooling cover cools the region around the venting device of the damaged cell to ensure its mechanical integrity by removing additional heat from this region. This leads to reduced temperatures in this region and, hence, heat transfer through the cell spacer to the neighboring cell(s) is reduced.

In addition, the cooling effect of cooling cover can be also applied to busbars that may be used in the battery module and/or battery pack, which prevents excessive heat transfer from the damaged cell to the neighboring cell(s).

By using a phase-changing fluid (e.g., water-glycol), the temperature can be held under a certain temperature (e.g., under about 130° C.) by controlled evaporation (of the water phase).

The cell cooling cover, according to the embodiment, provides separate venting gas flow to prevent contamination of the electrical harnesses, cooling of the venting gas to avoid deflagration, cooling of the top cell surface to prevent melt-down of the top cell surface, temperature reduction at the hottest area of the damaged cell, which is near the venting device, and/or cooling of the busbars for more efficient emergency cooling.

The cooling unit can be modified to concurrently (or simultaneously) act as bottom and/or side cooler in a multi floor (or multi-layer) design.

The cooling unit can be modified to be a load carrying component of the housing structure.

The venting gas channels can be designed in a way that the venting gas primarily flows through specific regions.

The fluid cooled cell cover (e.g., the cell cooling cover according to the first embodiment) acts as a cooler for the sides of the individual battery cells at where their respective venting outlets are implemented (e.g., the top sides of the cells or, in some cases, the bottom sides or lateral sides of the cells) and, at the same time, as a cooler for the venting gas and, if present in the battery module of battery pack to be cooled, for one or more busbars. Moreover, the cell cooling cover acts as a separation element between the electrical wiring and the venting gas channel.

From the above description of the cell cover according to the first embodiment, it follows that the main channels are arranged in a pairwise configuration (e.g., one for each of the stacks of battery cells) including one pair of main channels with one of the main channels of this pair running (or extending) between the first terminals of the battery cells of that stack and the venting outlets of the battery cells of that stack and the other one of the main channels of this pair running (or extending) between the venting outlets of the battery cells of that stack and the second terminals of the battery cells of that stack.

In some embodiments, when the first sides are the terminal sides, the arrangement of the cell cover covering the battery module may be also illustrated as follows. For each of the stacks of battery cells, the first terminals of the battery cells in the respective stack may be lined up along a respective (e.g., virtual) first line, and correspondingly, the second terminals of the battery cells in the respective stack may be lined up along a respective (e.g., virtual) second line. Similarly, the venting outlets of the battery cells in respective stack may be arranged along a respective (e.g., virtual) third line, the third line running (or extending) between the first line and the second line. The first, second, and third line may not intersect each other and may not cross each other when viewed along a direction perpendicular to the terminal sides of the battery cells of the stack. When the battery module is suitably covered by the cell cover (e.g., when the cell cover is being brought into position relative to the battery module), one of the main channels is arranged between the first line and the third line with respect to this stack, and another one of the main channels is arranged between the second line and the third line with respect to this stack. The first, second, and third line may or may not be straight lines.

In some embodiments, the first terminals may each be connected to a first busbar. The first busbar may run essentially along the above-described first line. The first busbar may be thermally connected to the cooling cover. Correspondingly, in some embodiments, the second terminals may each be connected to a second busbar. The second busbar may run essentially along the above-described second line. The second busbar may be thermally connected to the cooling cover.

For some of the stacks of battery cells or for each stack of battery cells in the battery module, the first terminals may be negative terminals and the second terminals may be positive terminals. For some of the stacks of battery cells or for each stack of battery cells in the battery module, the first terminals may be negative terminals and the second terminals may be positive terminals.

For some of the stacks of battery cells or for each stack of battery cells in the battery module, the first terminals may be, in an alternating manner, negative and positive terminals, starting with a negative terminal, and the second terminals may be, in an alternating manner, positive and negative terminals, starting with a positive terminal, when viewed along a direction in which the battery cells are stacked in this stack.

Each of the battery cells in the battery module may have a prismatic shape.

In some embodiments of the cell cover, the number of main channels is twice the number of stacks of battery cells in the module. In other words, the number of pairs of first channels is equal to the number of stacks of battery cells. Then, for each stack in the battery module, the cell cover provides one pair of main channels (i.e., two adjacent main channels).

However, in some embodiments of the cell cover, the number of main channels is greater than double the number of stacks of battery cells in the module. Then, for each stack in the battery module, the cell cover still provides one pair of main channels (i.e., two adjacent main channels). For example, the cell cover may be configured to be used with modules including up to a number N of stacks (e.g., the cell cover may also be used for battery modules with a number lower than N).

Embodiments of the cell cover may be configured for covering battery modules in which, for at least some of the stacks of battery cells, such as for each of the stacks of battery cells, the first terminals of the battery cells in the respective stack are arranged along a (e.g., virtual) first straight line, and/or the second terminals of the battery cells in the respective stack are arranged along a (e.g., virtual) second straight line, and/or the venting outlets of the battery cells in the respective stack are arranged along a (e.g., virtual) third straight line.

Embodiments of the cell cover may be configured especially for covering battery modules in which, for each of the stacks of battery cells, the first terminals of the battery cells in the respective stack are arranged along a (e.g., virtual) first straight line, and the second terminals of the battery cells in the respective stack are arranged along a (e.g., virtual) second straight line, and the venting outlets of the battery cells in the respective stack are arranged along a (e.g., virtual) third straight line. In such embodiments, the main channels may each extend along a straight line.

Generally, a battery module includes a plurality of stacks of battery cells, with the various stacks being orientated along the same direction (i.e., the stacks are orientated essentially in parallel). Here, the "orientation" of a stack of battery cells shall denote the direction in which the individual battery cells are stacked or aligned (e.g., placed one after another in the stack). When the battery cells in a stack are identically shaped and each cell is arranged in the same orientation (related to the cell) in the stack, the negative terminals are lined up in a first straight line parallel to the second straight line along which the positive terminals are lined up and are also parallel to the third straight line along which the venting outlets are lined up. Moreover, the first, second, and third straight line extend along the orientation of the stack. In embodiments of the cell cover that are configured for covering such battery modules, each of the main channels may extend parallel to the orientation of the stacks of battery cells.

In one embodiment, the cell cooling cover has at least one venting opening. Each of the venting openings is configured for letting a vent gas pass through the cell cover. The venting openings are arranged in the cell cooling cover such that, when the cell cooling cover is in the position relative to (e.g., is on) the battery module, at least some of the venting openings are aligned with one of the venting outlets when viewed in a direction perpendicular to the first (or terminal) sides. Then, vent gases that are generated inside the individual battery cells and ejected from the battery cells via the venting outlet provided in the respective first side of a battery cell are discharged to the other side of the cell cover (e.g., the side of the cell cover facing away from the battery module when the cell cover covers the battery module). In the individual battery cells, a venting valve may be provided in an internal venting channel such that vent gas generated inside the cell first has to pass through the venting valve before it is discharged out of the battery cell via the venting outlet of this cell.

In some embodiments, each of the venting openings is aligned with one of the venting outlets when viewed in a direction perpendicular to the terminal sides in a state in which the cell cover covers the battery module in the position.

In one embodiment of the cell cooling cover, each of the main channels has (e.g., is defined by) a bottom part and a top part. The top part of each of the main channels is formed by the cover plate, and the bottom part of each of the main channels is formed by an area of a bottom plate. For example, one cover plate forms the top part of each of the main channels. The top part of each of the main channels may be a part of the cover plate. Further, one bottom plate may, in some embodiments, form a single bottom part or may, in other embodiments, form more (e.g., two) bottom parts.

The terms "bottom part" and "top part" (and similar expressions) facilitate the intelligibility of the explanation and are consistent with the figures. In another orientation of the cell cover, the perspective of the viewer must be accordingly adapted. Expressions such as "first part" and "second part" could be likewise used instead of "bottom part" and "top part," respectively. For example, "bottom part" could be replaced by "first part," and "top part" could be replaced by "second part" throughout the following. Similarly, the terms "bottom plate" and "cover plate" could be replaced by "first plate" and "second plate," respectively.

Also, the cell cooling cover may be placed on a side of a battery module that faces in a direction opposite to the direction of the gravity force when the battery module is implemented in a vehicle and the vehicle is in a normal driving position. Rather, the cell cooling cover may also be employed to cover a side face or a bottom face of a battery module, provided that the side faces and/or bottom faces are the first sides of the stacked battery cells as described above, the first sides and/or bottom side forming (a part of) the respective side or the bottom of the battery module.

In one embodiment of the cell cooling cover, each of the stacks of battery cells is provided on one of the bottom plates with the bottom plate being configured for being placed when the cell cooling cover is brought into position relative to the battery module on each of first sides of the battery cells in the respective stack.

In one embodiment of the cell cooling cover, for each of the stacks of battery cells, the bottom plate provided for this stack is configured to be placed between the first terminals and the second terminals of the battery cells in the respective stack. Each of the bottom plates has a first edge adjacent to the first terminals of the battery cells of the stack for which the bottom plate is provided when the cell cooling cover is brought into position relative to the battery module. Also, each of the bottom plates has a second edge adjacent to the second terminals of the battery cells of the stack for which the bottom plate is provided when the cell cooling cover is brought into position relative to the battery module.

In an embodiment of the cell cooling cover, all or at least some of the bottom plates have a flat shape extending parallel to the first sides when the cell cover is brought into position relative to the battery module. This provides a large contact area between the first sides of the battery cells on which the respective bottom plate is placed and, thus, efficient heat exchange between the battery cells and a coolant flowing through the respective channel (e.g., the channel formed between the cover plate and the respective bottom plate) when the battery module is covered by the cell cover.

In one embodiment of the cell cooling cover, each of the bottom plates has a first side part and a second side part. The first side part extends between the cover plate and the first edge of this bottom plate, and the second side part extends between the cover plate and the second edge of this bottom plate.

In some embodiments, in some or each of the aforedescribed bottom plates, the respective first side part has a first cantilever configured to overhang over the first terminals of the stack for which the respective bottom plate is provided when the cell cover is in position relative to the battery module, and an area (or portion) of the first cantilever is attached to an area of the cover plate. In some embodiments, in some or each of the afore-described bottom plates, the respective second side part has a second cantilever configured to overhang over the second terminals of the stack for which the respective bottom plate is provided when the cell cover is in position relative to the battery module, and an area (or portion) of the second cantilever is attached to an area of the cover plate.

In one embodiment of the cell cooling cover, the cover plate has one or more indentations. The number of indentations may be equal to the number of bottom plates. Each of the indentations extends to and is coupled (or attached) to one of the bottom plates and is arranged, along the whole length of the bottom plate, between the first edge and the second edge of the bottom plate with a distance to the first edge and to the second edge.

Then, for each of the bottom plates, a pair of a first main channel and a second main channel is formed between the cover plate and the bottom plate. In one direction (e.g., perpendicular to the first sides of the battery cells of the respective stack when the when the cell cover is in position relative to the battery module), the interior of the both of the channels of that pair of main channels extend between the cover plate and the respective bottom plate. The interior of the first main channel is confined by the first side part and the respective indentation attached to the bottom part in a direction perpendicular to the flow direction of the first main channel. Further, the interior of the second main channel is confined by the second side part and the respective indentation attached to the bottom part in a direction perpendicular to the flow direction of the second main channel.

In some embodiments, for some or each of the indentations, the part of the indentation that is attached to the respective bottom part is welded to the respective bottom part.

In some embodiments, for some or each of the indentations, the part of the indentation that is attached to the respective bottom part has a flat shape extending over an area of the respective bottom part.

In one embodiment of the cell cooling cover, each of venting openings is a first hole through one of the bottom plates and a second hole through the cover plate in the area of the indentation attached to the respective bottom plate. The first hole and the second hole are aligned to each other when viewed in a direction perpendicular to the cover plate.

In some embodiments, the cell cooling cover may include a cover plate and a channel system, in which the channels system include one or more pipes (e.g., a meandering pipe or a plurality of pipes each being connected with a first end to a first connection pipe and with another end to second connection pipe). The channel system may be affixed to the bottom side of the cover plate.

In one embodiment of the cell cooling cover, for each pair of a first main channel and a second main channel provided on the first sides of the battery cells of the same stack of battery cells, when bringing the cell cooling cover into position relative to the battery module, the first main channel and the second main channel are connected to each other by a connection channel. Thereby, the first main channel, the connection channel, and the second main channel may together form a U-shaped channel.

In such an embodiment, the first main channel of a pair of main channels provided for one stack may include a first main channel inlet and a first main channel outlet, and the second main channel of that pair of main channels may include a second main channel inlet and a second main channel outlet. When the cell cover is brought into position relative to the battery module such that that first main channel and the second main channel run along the same stack of battery cells, the first main channel outlet and the second main channel inlet may be provided at the same end of the stack. Further, the connection channel may have a connection channel inlet and a connection channel outlet. Then, the first main channel outlet may open out into the connection channel inlet, and the connection channel outlet may open out into the second main channel inlet. The system of the first main channel, the connection channel, and the second main channel may form a U-shaped channel. The connection of the first main channel with the connection channel as well as the connection of the connection channel with the second main channel are each sealed so as to provide fluid connection (e.g., fluid-tight connection) between the main channels and the connection channel when a coolant is guided through the U-shaped channel including the first main channel, the connection channel, and the second main channel.

Here and in the following, the wording "connection of a channel with another channel" and similar wordings shall generally refer to a situation in which an outlet of one of these channels opens out into the inlet of the other of these channels to provide a sealed fluid connection of these channels when a fluid (such as a coolant) is guided through these channels. The term "sealed" shall denote that no fluid can leak out of the connection of these channels. A sealed connection can be provided, for example, by welded to separate channels together in a suitable way such that the connection of these channels is established. Additionally or alternatively, a gasket may be used to provide the sealing. However, a connection between a first channel and a second channel may also be established by using one channel (e.g., an integral channel) in which a first part is referred to as a "first channel" and a second part is referred to as a "second channel." Then, neither a gasket nor welding is required to provide a sealed connection. For example, a U-shaped channel including a first channel, a second channel, and connection channel connecting the first and the second channel can be established by taking one linearly extending channel and bending it at two positions s to achieve a shape resembling the letter U. The same applies correspondingly for open channels or open channel parts (e.g., channels or channel parts with a cross-section not being shaped as a closed curve, such as a half-circle).

In an embodiment of the cell cover configured for covering a battery module including only a single stack of battery cells, the complete channel system may include only a single U-shaped channel as described before (e.g., a system including a first main channel, a second main channel, and a connection channel connecting the first and the second main channel).

Embodiments of the cell cover may be configured for covering a battery module including a plurality of stacks of battery cells with the stacks being orientated essentially in parallel to each other and arranged adjacent to each other in a direction perpendicular to their orientation. Here, each of the stacks has a first end and a second end, and when viewed in a direction of the orientation of stacks, the second end of each stack is arranged after the first end of the respective stack. Then, the connection channels may each be arranged on the second end of the stack. In such embodiments, one U-shaped channel as described above may be provided for each of the stacks. Further, each of the U-shaped channels may each be orientated such that its respective connection channel is provided at the second end of the respective stack for which the U-shaped channel is provided when the cell cover is in position relative to the battery module. Each of the U-shaped channels then has an inlet (e.g., formed by the inlet of the respective first main channel) and an outlet (e.g., formed by the outlet of the outlet of the respective second main channel). Then, for each of the U-shaped channels, the respective inlet and the respective outlet is provided at the first end of the respective stack. Then, when viewing in a direction D perpendicular to the orientation of the stacks, the outlet of each of the U-shaped channels (except for the outlet of the last U-shaped channel in this direction D) may be connected with the inlet of the next U-shaped channel (e.g., in the direction D). When the U-shaped channels are arranged such that the first main channels alternate with the second main channels, the complete channel system of the cell cover has a meandering shape. The inlet of the channel system is then provided by the inlet of the first U-shaped channel (with respect to the direction D), and the outlet of the channel system is provided by the outlet of the last U-shaped channel (with respect to the direction D). In such an embodiment, the main channels can be considered as being connected in series within the channel system of the cell cover.

In one embodiment of the cell cooling cover, the channel system includes a first connection channel and a second connection channel, and each of the main channels is connected with the first connection channel as well as with the second connection channel.

For example, each of the main channels has an inlet and an outlet, the first connection channel has a plurality of outlets, and the second connection channel has a plurality of inlets. The number of outlets in the first connection channel is equal to the number of inlets in the second connection channel, which, in turn, is equal to the number of main channels. Each of the outlets of the first connection channels opens into the inlet of one of the main channels, and for each main channel, the respective outlet opens into one of the inlets of the second connection channel. In such an embodiment, the main channels can be considered as being connected in parallel within the channel system of the cell cover.

Furthermore, the first connection channel may include an inlet acting as the inlet of the complete channel system of the cell cover. Correspondingly, the second connection channel may have an outlet acting as the outlet of the channel system.

In some embodiments, the cell cover may be made of metal. In other embodiments, the cell cover may be made of plastic. In some embodiments, the cover plate may be made of metal and some or all of the bottom plates may be made of plastic. In other embodiments, the cover plate may be made of plastics, and some or all of the bottom plates may be made of metal.

In one embodiment of the cell cooling cover, the side of the cell cooling cover configured to face the battery cells of the battery module when the cell cooling covers is in position relative to the battery module, includes an electrical insulation layer. Here, the term "electrical insulation layer" refers to a layer made of or including an electrical insulator (e.g., a plastic material) and, thus, prohibits electrical contact between two entities separated by this layer. The electrical insulation layer may be helpful to prevent unwanted electrical connections (e.g., short-circuit faults) between the cell cover and the battery, including when the cell cover is completely or partly made of metal.

A second embodiment of the present disclosure relates to a covered battery module including: a cell cooling cover as described above and a battery module defined as follows. The battery module includes at least one stack of battery cells. Each of the battery cells has a first side with an essentially planar shape. All the first sides face in the same direction and extend along one virtual plane. Each of the first sides has a venting outlet. Further, the cell cooling cover is attached to the battery module in position relative to the battery module.

In one embodiment of the covered battery module, the battery module further includes a coolant supply channel and a coolant discharge channel. An inlet of the channel system is connected with the coolant supply channel and an outlet of the channel system is connected with the coolant discharge channel.

In one embodiment of the covered battery module, the covered battery module has a side wall, and the coolant supply channel is integrated into the side wall and/or the coolant discharge channel is integrated into the side wall.

In one embodiment of the covered battery module, the covered battery cell module includes a housing with a side wall, and a burst element may be integrated into the side wall. The burst element is configured for disconnecting from the wall when a gas pressure inside the housing or a part of the housing confined by the side wall exceeds a reference (or predefined) value.

In an embodiment of the covered battery module, the channel system of the cell cover includes an inlet for being supplied with a coolant and an outlet for discharging coolant. The inlet and the outlet of the channel system of the cell cover may be directly accessible from the outside of the covered battery module. Then, the channel systems can be easily connected with a coolant supply (and discharge) system from the outside.

The covered battery module may be accommodated in a suitable housing. The housing may have holes for discharging vent gases. An inlet of the channel system (or a coolant supply channel of the battery module) may be directly accessible from the outside of the housing. Similarly, an outlet of the channel system (or a coolant discharge channel of the battery module) may be directly accessible from the outside of the housing. This facilitates the connection of the channels system with a coolant supply (and discharge) system from the outside.

In one embodiment of the covered battery module, the battery module has side walls extending perpendicular to the side terminals of the battery cells. Further, a seal is provided between some or each of the side walls and the cell cooling cover to prevent an undesired leakage of vent gases through gaps between side walls and the cell cover.

A third embodiment of the disclosure relates to a battery pack including a plurality of covered battery modules as described above in which the covered battery modules are arranged as a pile in that, except for a first one of the covered battery modules forming a base of the pile, each of the covered battery modules is arranged on cell cooling cover of another covered battery module.

In an embodiment of the battery pack, for each of the cell covers on which a battery module is arranged, room (or space) is provided between the respective cell cooling cover and the battery module arranged on this cell cover. The room is configured to receive vent gases from the battery cells in the respective battery module.

When venting openings are provided in the cell cover, the vent gases generated inside a battery cell and ejected from the cell via the cell's venting outlet can then pass through at least one venting opening provided in the cell cover and then enter the room provided between the cell cover and the next battery module arranged (indirectly by being spaced apart by the space of the respecting room) on the respective cell cover. Adjacent to the cell cover of the last battery module in the pile of battery modules forming the battery pack (e.g., the battery module opposite, in the pile, to the battery module forming the base of the pile), no room may be provided because the vent gases can directly enter the atmosphere surrounding the battery pack.

In an embodiment of the battery pack, the channel system of each cell cover has an individual inlet for being supplied with a coolant and an individual outlet for discharging coolant.

In some embodiments of the battery pack, the individual inlets and outlets of the channel systems of the cell covers may each be directly accessible from the outside of the battery pack. Then, each of the channel systems can be easily connected with a coolant supply (and discharge) system from the outside.

In some embodiments of the battery pack, the channel systems of the cell covers are connected in series. To that end, the outlet of each of the of the channel systems may be connected with the inlet of a further one of the channel systems (not yet being connected) until no further (unconnected) channel system is left. After that procedure, one of the channels systems has an unconnected inlet. This inlet may act as the coolant inlet of the complete battery pack. Another one of the channel systems has an unconnected outlet. This outlet may act as the coolant outlet of the complete battery pack.

The battery pack may be accommodated in a suitable housing. The housing may have holes for discharging vent gases. An inlet of the channel system (or a coolant supply channel of the battery module) may be directly accessible from the outside of the housing. Similarly, an outlet of the channel system (or a coolant discharge channel of the battery module) may be directly accessible from the outside of the housing. This facilitates the connection of the channels system with a coolant supply (and discharge) system from the outside.

A fourth embodiment of the present disclosure relates to a vehicle including at least one covered battery module as described above and/or at least one battery pack as described above.

In each of the embodiments described herein, the roles of the "outlets" and "inlets" can be switched; for example, any "inlet" can be regarded as an "outlet" and any "outlet" is regarded as an "inlet". The above-described topologies of the channel system (e.g., the described possibilities how the various channels in the channel system may be connected with each other irrespectively of the special geometric design) are not affected by such a switch. However, if applicable, the roles of the supply channel and the discharge channel of the battery module may be correspondingly changed.

FIG. 1A is a perspective view schematically illustrating an embodiment of a covered battery module according to the present disclosure. To facilitate the following description, the Cartesian coordinate system with the axes x, y, z is depicted in the drawings. The covered battery module includes a battery module 800 and cell cooling cover 100. In this embodiment, the battery module 800 includes a single stack 810 of battery cells lined up along (or aligned in) the x-direction of the coordinate system with a first battery cell $80_1$ arranged at a first end of the stack 810, a last battery cell $80_N$ arranged at a second end of the stack 810, and a plurality of battery cells $80_i$ arranged between first battery cell $80_1$ and the last battery cell $80_N$. For the sake of a clear presentation, only one of the battery cells arranged between first battery cell $80_1$ and the last battery cell $80_N$ has been labeled by a reference sign ("$80_i$"). The index "i" may be regarded as a variable that could be any integer number between 1 and N (i.e., 1<i<N), where N denotes the total number of battery cells in the stack 810. Thus, any one of the battery cells could be labeled by its position in the stack 810. For example, the battery cell marked by "$80_i$" in FIG. 1A is the seventh battery cell in the stack 810 when counting in the direction of the x-axis such that it could also be labeled as "$80_7$".

Figure 1B:
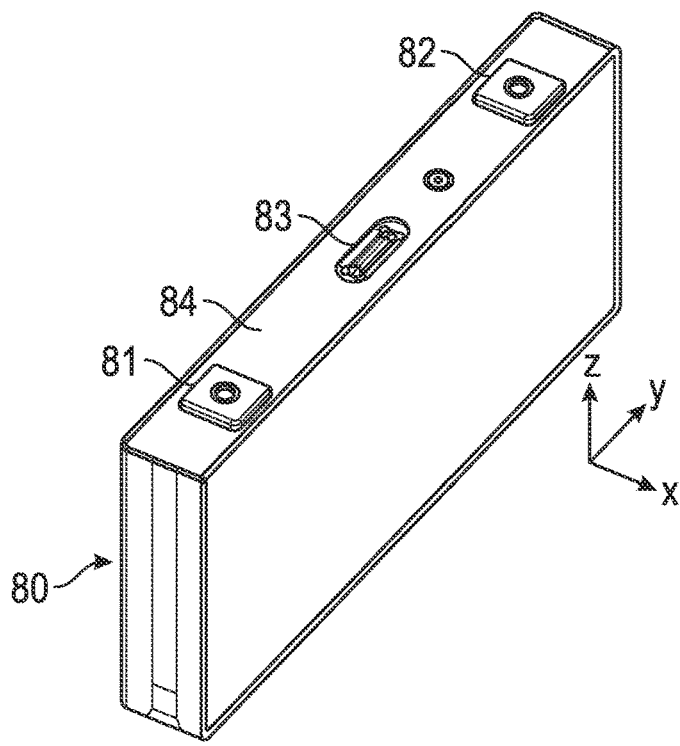
FIG. 1B schematically shows, in a perspective view, an individual battery cell that may be used with the covered battery module shown in FIG. 1.

The design of each of the battery cells (e.g., each identically shaped battery cell) in the stack 810 shown in FIG. 1A is schematically illustrated in FIG. 1B, which shows an individual battery cell 80 with reference to a Cartesian coordinate system in a perspective view. The battery cell 80 has a prismatic (e.g. cuboid) shape. On an upper side surface 84 of the battery cell 80 (e.g., the battery cell's side surface facing in the z-direction of the coordinate system), a first terminal 81 and a second terminal 82 are arranged. The terminals 81, 82 allow for an electrical connection of the battery cell 80. The first terminal 81 may be the negative terminal of the battery cell 80, and the second terminal 82 may be the positive terminal of the battery cell 80. Accordingly, the upper side surface 84 will, in the following description, be referred to as the "terminal side" of battery cell 80. Between the first terminal 81 and the second terminal 82, a venting outlet 83 is arranged in the terminal side 84. The venting outlet 83 is configured for exhaling (or exhausting) vent gases out of the battery cell 80 that have been generated inside the battery cell 80, for example, during a thermal event occurring in the battery cell 80, such as a thermal run-away. Before being output via the venting outlet 83, the vent gas may pass through (or may burst) a venting valve arranged inside the battery cell 80. By stacking the plurality of battery cells 80, each of which is the same or similar to the battery cell 80 shown in FIG. 1B, along the first direction x in FIG. 1A, the stack 810 of battery cells $80_1$, $80_i$, $80_N$ depicted in FIG. 1A or FIG. 1C is formed.

Figure 1C:
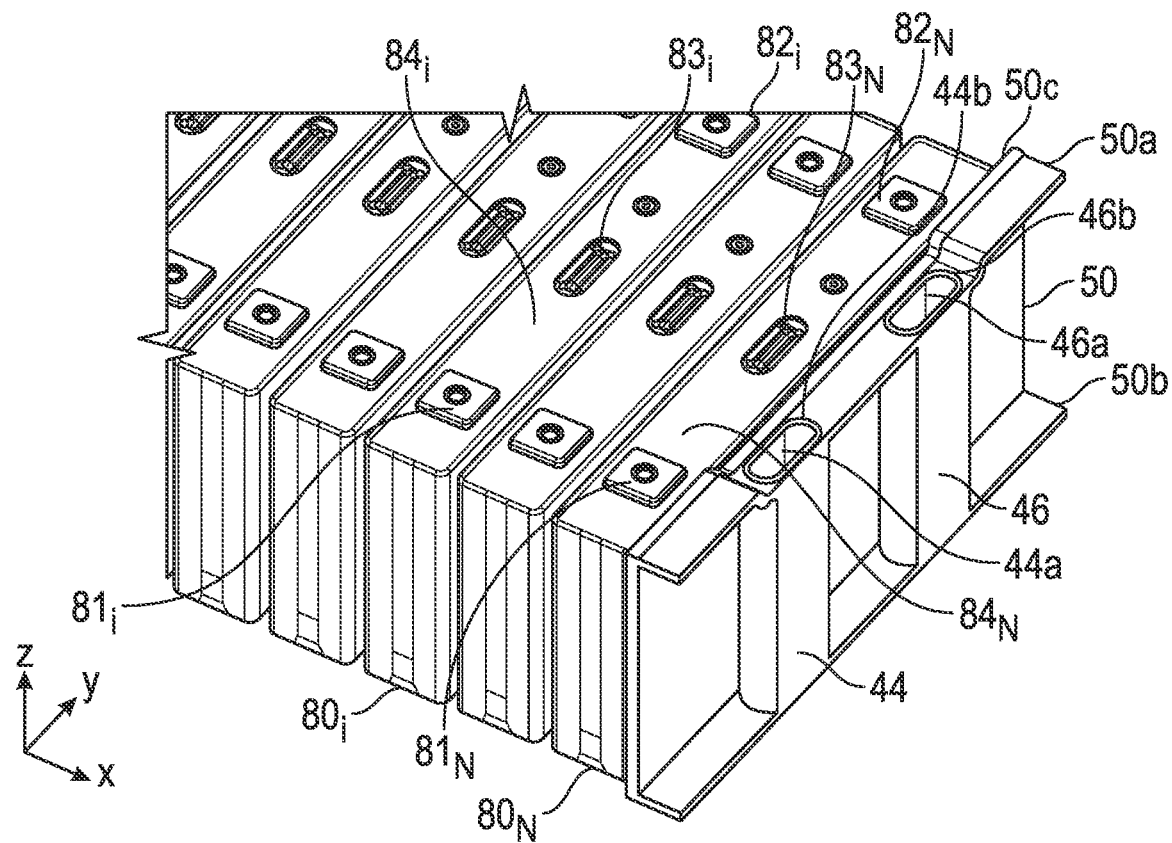
FIG. 1C schematically illustrates, in a perspective view, a second end of a stack of battery modules used in the covered battery module shown in FIG. 1A.

FIG. 1C schematically illustrates, in a perspective view, the second end of stack 810 shown in FIG. 1A. As explained above with reference to FIG. 1B, each of the individual battery cells $80_i$, $80_N$ has a respective first terminal $81_i$, $81_N$, a respective second terminal $82_i$, $82_N$, and a respective venting outlet $83_i$, $83_N$ that is arranged on a respective terminal side $84_i$, $84_N$ of the battery cell $80_i$, $80_N$. With respect to the orientation of the stack 810 (in FIGS. 1A and 1C, along the x-direction), the stack 810 may be confined and held by end-plates. In FIGS. 1A and 1C, one end-plate 50 is shown that is attached to the side surface facing into the x-direction of the last battery cell $80_N$ arranged in the stack 810. The end-plate 50 may be part of housing, in which the battery module 800 may be accommodated. Further details of end-plate 50 of the covered battery module will be explained below.

As can be seen in FIG. 1A, the cell cooling cover 100 extends over any one of (or all of) the terminal sides of the battery cells $80_1$, $80_i$, $80_N$ in the stack 810. In other words, the cell cooling cover 100 covers the stack 810 of battery cells $80_1$, $80_i$, $80_N$. An indentation (e.g., an opening) 122 centered with respect to the edges of the cell cooling cover 100 orientated parallel to the x-direction is arranged in the top surface of the cell cooling cover 100. The indentation 122 has an elongated shape extending along the x-direction but neither reaches the rear end of the cell cooling cover 100

(e.g., the end of the cell cooling cover 100 located at the first end of stack 810) nor reaches the front end of the cell cooling cover 100 (e.g., the end of the cell cooling cover 100 located at the second end of stack 810). In the indentation 122, a plurality of venting openings $30_1$, $30_i$, $30_N$ is arranged. The venting openings $30_1$, $30_i$, $30_N$ are located such that, above each of the venting outlets $83_1$, $83_i$, $83_N$ of the battery cells $80_1$, $80_i$, $80_N$ in the stack 810, one of the venting openings $30_1$, $30_i$, $30_N$ in the cell cooling cover 100 is positioned directly above the venting outlet (e.g., each of the venting outlets $83_1$, $83_i$, $83_N$ is aligned with a respective venting opening $30_1$, $30_i$, $30_N$ with regard to the z-direction).

At the first end of the stack 810, the cell cooling cover 100 overhangs over the first battery cell $80_1$ in the x-direction. In a corresponding manner, the cell cooling cover 100 overhangs over the last battery cell $80_N$ in the x-direction and also covers an upper edge (or upper flange) 50a of the end-plate 50. These overhanging portions of the cell cooling cover 100 will be explained more detailed below with reference to FIG. 3.

Figure 2:
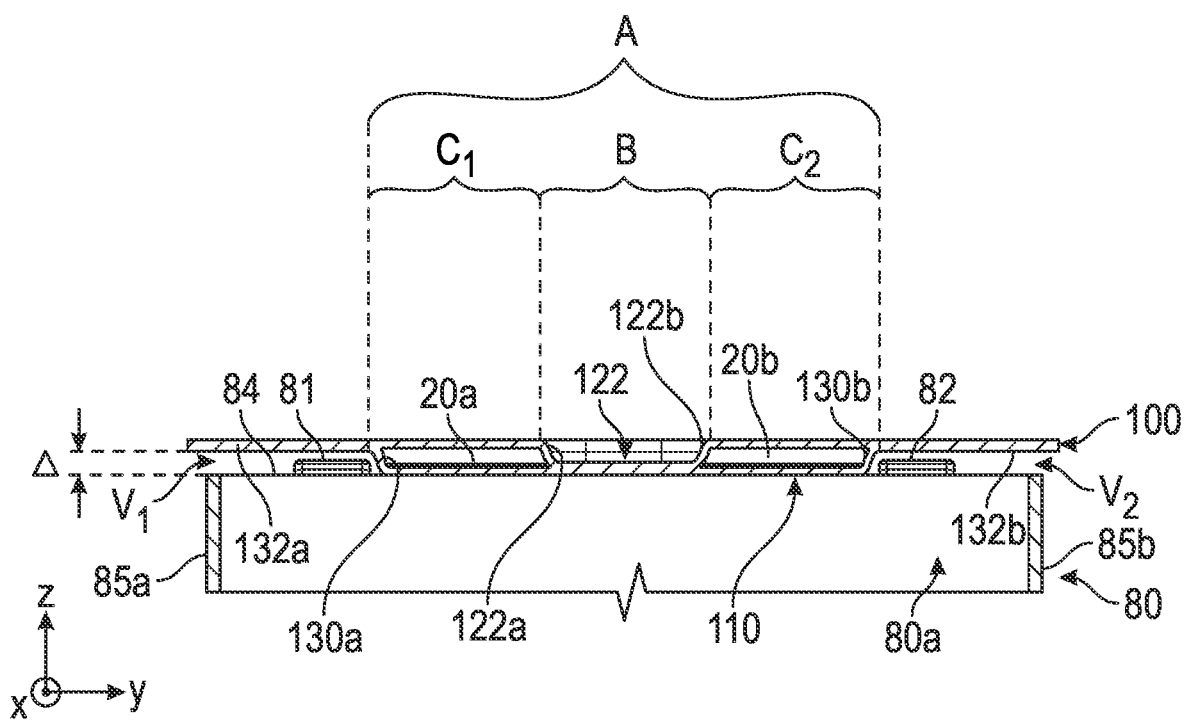
FIG. 2 schematically illustrates a cross-sectional view of the covered battery module shown in FIG. 1A.
Figure 3:
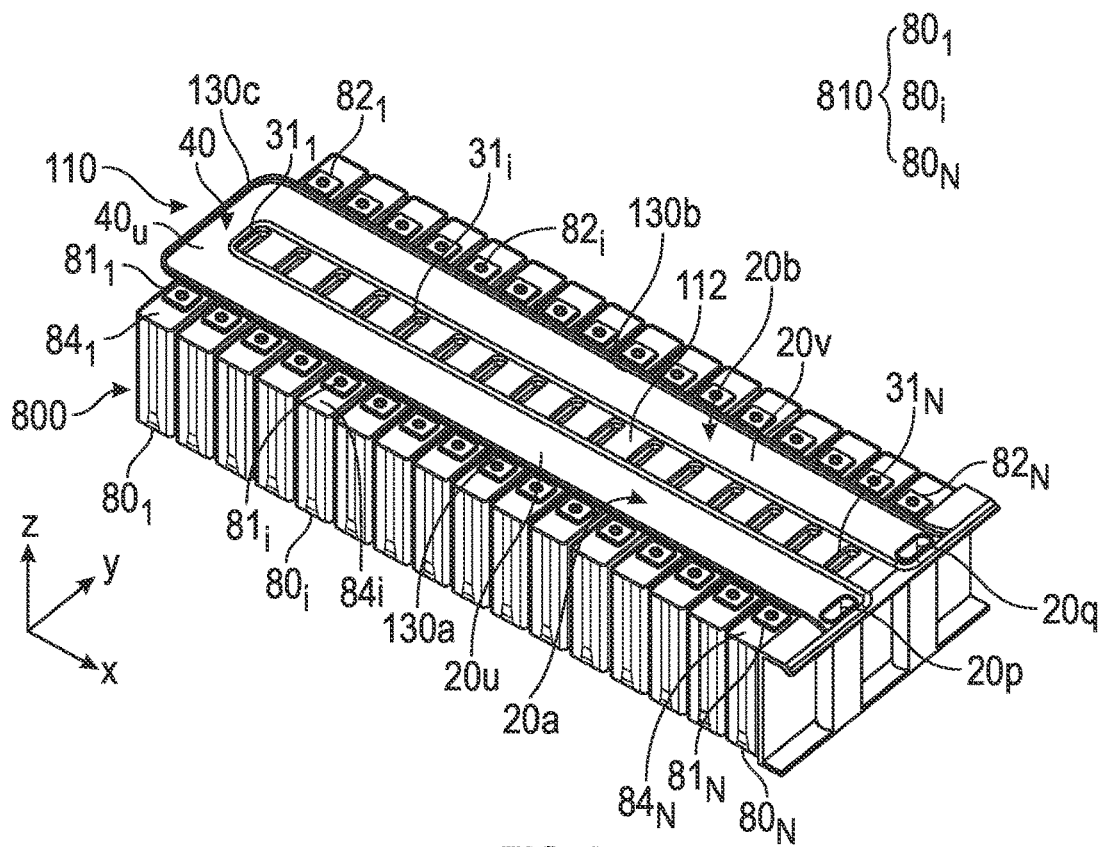
FIG. 3 is a perspective view schematically illustrating a bottom plate arranged on top of the stack of battery cells shown in FIG. 1A.

FIG. 1 shows an embodiment of a fluid cooled cell cover for one module with punctures (or openings) for the cell venting devices. The fluid channels are depicted in FIGS. 2 and 3. The fluid channels may be thermally connected with the top surface of the cells and, optionally, with busbars with a gap filler. For a second isolation barrier, the bottom surface of the cell cover may be coated with an additional electrical insulating material, such as a polymer coating or film. As can be seen in FIGS. 1A and 1C, the cell cover may be clamped and sealed with the housing walls. On the upper housing wall, there may be a burst element. This will be described below in more detail.

FIG. 2 schematically illustrates a cross-sectional view taken through the embodiment of the covered battery module shown in FIG. 1A. The cross-section is taken along a plane parallel to the y-z-plane of the coordinate system. FIG. 2 shows an upper portion of a battery cell 80 that could be any one of the battery cells $80_1$, $80_i$, $80_N$ in the stack 810. As can be seen, the cross-section is taken with respect to the x-direction at a position where no venting outlet $83_1$, $83_i$, $83_N$ or venting opening $30_1$, $30_i$, $30_N$ is present. The interior 80a of the battery cell 80 is confined, with respect to the y-direction of the coordinate system, by a first cell side wall 85a and second cell side wall 85b and, with respect to the z-direction, by the terminal side 84. The first terminal 81 and the second terminal 82 are arranged on the terminal side 84. The entire terminal side 84 is covered by the cell cooling cover 100. Thereby, the cell cooling cover 100 touches (or contacts) the terminal side 84 in area of the terminal side 84 between the first terminal 81 and the second terminal 82. In the area of the terminals 81, 82 as well as in the areas of the terminal side 84 to the left of the first terminal 81 and to the right of the second terminal 82 (with respect to FIG. 2), however, the cell cooling cover 100 is spaced apart from the terminal side 84 with respect to the z-direction to leave space for the first and second terminal 81, 82 protruding from the terminal side 84 into the z-direction.

In the illustrated embodiment, the cell cooling cover 100 includes a bottom plate 110 and a cover plate 120. In the y-direction, the bottom plate 110 extends in an area A between the first terminal 81 and the second terminal 82. In each point of this area A, the bottom plate 110 may touch the terminal side 84 or may be fixedly attached to the terminal side 84. In some embodiments, an electrical insulation layer may be between the bottom plate 110 and the terminal side 84 (with an otherwise identical structure of the bottom plate 110 and the terminal side 84). The electrical insulation layer may prevent electrical contact between the bottom plate 110, which is a part of the cell cooling cover 100, and the terminal side 84 of the battery cells 80. The electrical insulation layer may be included in embodiments in which the bottom plate 110 or the complete cell cooling cover 100 is made of a conductive material, such as a metal. The thermal contact between the terminal side 84 and the bottom plate 110 should be maximized. To that end, heat exchange between the terminal site 84 and the bottom plate 110 is enabled at any location within the area A. In the x-direction (i.e., perpendicular to the drawing plane of FIG. 2), the bottom plate 110 extends over all the terminal sides of each of the stacked battery cells $80_1$, $80_i$, $80_N$. Hence, thermal contact is established between the bottom plate 110 and any one of the battery cells $80_1$, $80_i$, $80_N$ in the stack 810 (noting that the battery cell 80 depicted in FIG. 2 may be any one of the stacked battery cells $80_1$, $80_i$, $80_N$ as shown in FIG. 1A).

The cover plate 120 is arranged above the bottom plate 110. In other words, the bottom plate 110 is positioned between the terminal side 84 and the cover plate 120. With respect to the x-direction as well as to the y-direction (e.g., a plane orthogonal to the drawing plane of FIG. 2), the cover plate 120 extends above the bottom plate 110 as well as over the (essentially planar) area formed by the entirety of each of the terminal sides 84 of the battery cells $80_N$ in the stack 810 such that the latter area is completely covered by the cover plate 120. Other than an area B at where the indentation 122 of the cover plate 120 is present, the cover plate 120 has an essentially planar shape and is arranged parallel to the terminal side 84 at a certain distance Δ to the terminal side 84 with reference to the z-direction. The distance Δ should at least be large enough to leave spaces $V_1$, $V_2$ between the terminal side 84 and the cover plate 120 into which the terminals 81, 82 can protrude. Also, the distance Δ should be large enough that, between the top side of the bottom plate 110 and the bottom side of the cover plate 120, a space is provided that forms part of the interior of main channels 20a, 20b arranged between the bottom plate 110 and the cover plate 120. In some embodiments, the distance Δ is large enough to additionally accommodate a first and/or second busbar in the spaces $V_1$, $V_2$. Furthermore, in some embodiments, the distance Δ may be large enough to accommodate, in the spaces $V_1$, $V_2$, parts (e.g., cantilevers 132a, 132b) of a first side part 130a and/or second side part 130b that may be arranged above the first terminal 81 and/or the second terminal 82, respectively.

As described above with reference to FIG. 1A, an indentation 122 is arranged in the top surface of the cell cooling cover 100. The indentation 122 is provided by an embayment (or groove) in the cover plate 120 in the z-direction. The indentation 122 is arranged in the centered area B of the cover plate 120 in the y-direction. The indentation 122 extends in the z-direction until it reaches (and thus touches) the top surface of the bottom plate 110 (or a gasket inserted between the indentation 122 and the bottom plate 110). The indentation 122 is attached to the top surface of the bottom plate 110 in a fluid-proof manner. To that end, the gasket may be inserted between the indentation 122 and the bottom plate 110. Due to this assembly, the space above the bottom plate 110 is divided into three sub-spaces. In the y-direction, a first sub-space extends in an area $C_1$ of the top surface of the bottom plate 110 located between the first terminal 81 and the indentation 122, and, correspondingly, a second sub-space extends in an area $C_2$ of the top surface of the bottom plate 110 located between the second terminal 82 and the indentation 122. The third sub-space extends between the areas $C_1$ and $C_2$ in the y-direction and is identical to the space above the bottom plate 110 in the area B at where the indentation 122 is arranged (or contacts) the bottom plate 110.

In the area B, at where the indentation 122 contacts the bottom plate 110 (or a gasket arranged between the indentation 122 and bottom plate 110), the indentation 122 may have an essentially planar portion extending parallel to the bottom plate 110. Then, as shown in FIG. 2, this essentially planar portion of the indentation 122 may rest flush on the top surface of the bottom plate 110 (however, in some embodiments, a gasket may be additionally arranged between the indentation 122 and the bottom plate 110). The indentation 122 may have a first indentation side part 122a and a second indentation side part 122b, each of which connect the essentially planar portion of the indentation 122 (e.g., the portion of the cover plate 120 in the area B) with those parts of the cover plate 120 that are distanced from the terminal side 84 by the distance Δ as described above. Each of the first indentation side part 122a and the second indentation side part 122b extends linearly parallel to the x-direction over the entire length of the indentation 122. The first indentation side part 122a connects the essentially planar portion of the indentation 122 with the adjacent portion of the cover plate 120 that extends over the first terminal 81. Correspondingly, the second indentation side part 122b connects the essentially planar portion of the indentation 122 with the adjacent portion of the cover plate 120 that extends over the second terminal 82. In some embodiments, the cover plate 120 including the indentation 122 (e.g., including the essentially planar portion of the indentation 122 and the first and second indentation side part 122a, 122b) are formed as one piece of material (e.g., are integrally formed).

Along the edge of the bottom plate 110 extending parallel to the x-direction adjacent to the first terminal 81, a first side part 130a is provided that extends from this edge of the bottom plate 110 to the bottom side of the cover plate 120. Correspondingly, along the edge of the bottom plate 110 extending parallel to the x-direction adjacent to the second terminal 82, a second side part 130b is provided that extends from this edge of the bottom plate 110 to the bottom side of the cover plate 120. Each of the first side part 130a and the second side part 130b extend linearly parallel to the x-direction over the complete length of the indentation 122. Further, each of the first side part 130a and the second side part 130b is attached to the bottom side of cover plates 120 in a fluid-proof manner. To that end, the first side part 130a may include, at its upper portion, a first cantilever 132a extending in an essentially planar manner over the first terminal 81 and being attached to the bottom side of the cover plate 120. Between the first cantilever 132a and the cover plate 120, a gasket 172a may be arranged (see, e.g., FIG. 6). A clamp 170 may be used to fix the gasket between the first cantilever 132a and the cover plate 120. Correspondingly, the second side part 130b may include, at its upper portion, a second cantilever 132b extending in an essentially planar manner over the second terminal 81 and being attached to the bottom side of the cover plate 120. Between the second cantilever 132b and the cover plate 120, a further gasket 172b may be arranged (see, e.g., FIG. 6). A clamp may be used to fix the gasket between the second cantilever 132b and the cover plate 120. The bottom plate 110, the first and second side parts 130a, 130b, and (if present) the first and second cantilevers 132a, 132b are formed as one piece of material.

Due to the afore-described assembly, a pair of channels is formed between the bottom plate 110 and the cover plate 120, and each of the channels linearly extends parallel to the x-direction. The pair of channels includes a first (e.g., main or primary) channel 20a and a second (e.g., main or primary) channel 20b. The first channel 20a is confined, with regard to the drawing plane (i.e., with reference to a cross-sectional view taken parallel to the y-z-plane and viewed against the x-direction), on its bottom side by the top side of bottom plate 110, on its top side by the bottom side of the cover plate 120, on its left side by the first side part 130a, and on its right side by the first indentation side part 122a. Correspondingly, the second channel 20b is confined, with regard to the drawing plane, on its bottom side by the top side of bottom plate 110, on its top side by the bottom side of the cover plate 120, on its right side by the second side part 130b, and on its left side by the second indentation side part 122b. In the illustrated embodiment, the cross-sectional profile of each of the channels 20a, 20b has an essentially flat or elongated shape extending parallel to the y-direction and, thus, parallel to the terminal side 84 of the battery cell 80. For example, each of the channels 20a, 20b as a large side lying against the terminal site 84, which allows for an efficient heat exchange between the battery cell 80 and the channels 20a, 20b.

As described above, the side parts 130a, 130b and the bottom plate 110 are, in some embodiments, formed as one piece of material. Further, the cover plate 120 and the indentation 122 (including, for example, the essentially planar portion extending in the area B and the first and second indentation side parts 122a, 122b) are, in some embodiments, formed as one piece of material. Potential spots at where coolant may leak will be the positions at where the bottom plate 110 and the cover plate 120 are attached to each other. In the illustrated embodiment, the mechanical connection of each of the cantilevers 132a, 132b with the cover plate 120, as well as the connection of the indentation 122 with the bottom plate 110, can prevent leakage. Thus, in some embodiments, suitable gaskets may be inserted at these spots to seal these connections such that these connections are fluid-proof. In other embodiments, these connections may be established by welding. The gaskets and/or the weld seams may linearly extend parallel to the x-direction over the length of the channels 20a, 20b.

FIG. 3 is a perspective view illustrating the bottom plate 110 arranged on top of the stack 810 of battery cells $80_1$, $80_i$, $80_N$. As can be seen in FIG. 3, a plurality of first holes (e.g., first openings) $31_1$, $31_i$, $31_N$ is arranged in a center portion of the bottom plate 110 with regard to the y-direction. The location of this center portion corresponds to the area B in FIG. 2; for example, the center portion is arranged below the indentation 122 of the cover plate 120. The first holes $31_1$, $31_i$, $31_N$ are located in the bottom plate 110 such that above each of the venting outlets $83_1$, $83_i$, $83_N$ of the battery cells $80_1$, $80_i$, $80_N$ in the stack 810, one of the first holes $31_1$, $31_i$, $31_N$ is positioned directly above the respective venting outlet (e.g., each of the venting outlets $83_1$, $83_i$, $83_N$ is aligned with a respective first hole $31_1$, $31_i$, $31_N$ with regard to the z-direction). Similarly, a plurality of second holes (e.g., second openings) $32_1$, $32_i$, $32_N$ is arranged in the essentially planar portion of the indentation 122 of the cover plate 120 as shown in FIG. 1A. The second holes $32_1$, $32_i$, $32_N$ are located in the cover plate 120 such that above each of the first holes $81_1$, $81_i$, $81_N$ in the essentially planar portion of the indentation 122, one of the second holes $32_1$, $32_i$, $32_N$ is positioned directly above the respective first hole. In some embodiments, the number of first holes $31_1$, $31_i$, $31_N$ is equal to the number of second holes $32_1$, $32_i$, $32_N$, which is in turn equal to the number of battery cells $80_1$, $80_i$, $80_N$ in the stack 810 (and thus, to the number of venting openings $30_1$, $30_i$, $30_N$). Each of the venting outlets $83_1$, $83_i$, $83_N$ is aligned with a respective first hole $31_1$, $31_i$, $31_N$ as well as with a respective second hole $32_1$, $32_i$, $32_N$ in the z-direction such that the vent gas exhaled (or exhausted) from one of venting outlets $83_1$, $83_i$, $83_N$ first passes through the respective first hole and subsequently passes through the respective second hole. Each of the venting openings $30_1$, $30_i$, $30_N$ as described before with reference to FIG. 1A is formed by a pair of one of the first holes $31_1$, $31_i$, $31_N$ arranged in the bottom plate 110 and the respective second hole $32_1$, $32_i$, $32_N$ arranged in the cover plate 120.

The vent gas, after passing through one of the second holes $32_1$, $32_i$, $32_N$, is immediately spatially separated from each of the battery cells $80_1$, $80_i$, $80_N$ by the cell cooling cover 100. Additionally, due to the cooling effect of the cell cooling cover 100 when being operated with a coolant flowing through the channels 20a, 20b, the ejected vent gas is also thermally separated from each of the battery cells $80_1$, $80_i$, $80_N$. Hence, undesired heating of the battery cells $80_1$, $80_i$, $80_N$ by the (typically very hot) vent gas ejected from one or more of the battery cells $80_1$, $80_i$, $80_N$ in the event of a thermal event, such as a thermal run-away, is prevented.

Because vent gases may include particles, such as graphite, the terminal sides may be polluted, which may deteriorate the functioning of the terminals of the battery cells and/or busbars arranged to connect terminals of the battery cells or even lead to a complete defect of these members. Thus, such deterioration or defects caused by a combination of the terminal sides with vent gas particles is also prevented by the cell cooling cover 100. Furthermore, hot vent gases can also deteriorate members outside the battery module or lead to defects of the latter or lead to deflagration at the outside of the battery module housing because the hot vent gas may deflagrate. The cooling of the ejected vent gases mitigates these issues. Here, the vent gas, which has been mechanically separated by the cell cooling cover 100 from the space in which the battery cells accommodated may be cooled by the top surface of the cell cooling cover 100. The cooling of the separated vent gas can be further supported by collecting the ejected vent gases in a vent gas collecting room R arranged at the side of the cell cooling cover 100 facing away from the battery module 800 been covered by the cell cooling cover 100. Collecting the ejected vent gases in a vent gas collecting room R also prevents vent gas from escaping into the environment of the battery module (or battery pack). This is schematically illustrated in, for example, FIG. 6 and will be described in more detail below.

In FIG. 3, it is further illustrated that the bottom plate 110 forms the bottom portions of both the first main channel 20a and the second main channel 20b, each extending linearly parallel to the x-direction over the entirety of terminal sides $84_1$, $84_i$, $84_N$ of the battery cells $80_1$, $80_i$, $80_N$ in the stack 810. Thereby, a first bottom part 20u (i.e., the bottom portion of the first main channel 20a) extends between the line along which the first holes $31_1$, $31_i$, $31_N$ are aligned in the bottom plate 110 and the line along which the first terminals $81_1$, $81_i$, $81_N$ are aligned. Correspondingly, a second bottom part 20v (i.e., the bottom portion of the second main channel 20b) extends between the line along which the first holes $31_1$, $31_i$, $31_N$ are aligned in the bottom plate 110 and the line along which the second terminals $82_1$, $82_i$, $82_N$ are aligned. In the area of the first end of the stack 810, the first and second main channels 20a, 20b are connected to each other by a connection channel 40 extending essentially parallel to the y-direction. In the example, a bottom portion 40u of the connection channel 40 is formed by a first overhanging portion of the bottom plate 110 protruding in the x-direction over the first end of the stack 810. Thereby, the first overhanging portion of the bottom plate 110 is, with regard to the z-direction, on the same level and immediately (or directly) connected to each of the bottom parts 20u, 20v of the first and second main channels 20a, 20b. Further, a rear side portion (with regard to the view in FIG. 3) of the connection channel 40 is formed by a connection channel side part 130c that connects to the rear ends of each of the first side part 130a and the second side part 130b of the first and second main channel 20a, 20b, respectively. A top portion of the connection channel 40 is formed by the rear end of the cover plate 120 overhanging in the x-direction over the first end of the stack 810 (see, e.g., FIG. 1A). A further side part of the connection channel 40 located opposite to the connection channel side part 130c with regard to the bottom portion 40u of the connection channel 40 is formed by a first indentation side part 122c (see, e.g., FIG. 1A) in a similar manner as shown for the main channels 20a, 20b in FIG. 2. Accordingly, the assembly of the pair of main channels 20a, 20b together with the connection channel 40 forms a U-shaped channel system configured for guiding a coolant back and forth across the entirety of the terminal sides $84_1$, $84_i$, $84_N$ of the battery cells $80_1$, $80_i$, $80_N$. The bottom portion of this U-shaped channel system includes the bottom parts 20u, 20v of the first and second main channel 20a, 20b as well as the bottom portion 40u of the connection channel as shown in FIG. 3.

As can be further seen in FIGS. 1A, 1C, and 3, the second end of the stack 810 of battery cells $80_1$, $80_i$, $80_N$ may be supported in the x-direction by the end-plate 50 extending parallel to the y-z-plane of the coordinate system. The shape of the end-plate 50 corresponds to the shape of the side face of the last battery cell $80_N$ in the stack 810, which faces into the x-direction. Thus, in the illustrated embodiment, the end-plate 50 has an essentially rectangular shape. An upper flange 50a protruding from the end-plate 50 into the x-direction may be arranged at the upper edge of the end-plate 50. Correspondingly, a lower flange 50b protruding from the end-plate 50 into the x-direction may be arranged at the lower edge of the end-plate 50. Thus, the upper flange 50a and the lower flanges 50b each extend parallel to the y-direction. A center portion of the upper flange 50a may be indented in the z-direction to receive (or accommodate) an overhanging portion of the cell cooling cover 100 when it is placed on top of the battery module 800. The flanges 50a, 50b may improve the mechanical stability of the end-plate 50. Furthermore, a coolant supply channel 44 and a coolant discharge channel 46 may be arranged in front of the end-plate 50 and may extend between the upper flange 50a and the lower flange 50b. Then, a first opening 44a and a second opening 46a may be arranged in the upper flange 50a, and the first opening 44a may act as an outlet of the coolant supply channel 44 and the second opening 46a may act as an inlet of the coolant discharge channel 46 (see, e.g., FIG. 1C). In a similar manner, an opening acting as an inlet of the coolant supply channel 44 as well as an opening acting as an outlet of the coolant discharge channel 46 are arranged in the lower flange 50b.

The cell cooling cover 100 overhangs over the last battery cell $80_N$ in the x-direction (see, e.g., FIG. 1A). For example, the bottom plate 110 covers the upper flange 50a of the end-plate 50, and at least the front ends (with regard to FIG. 3) of the bottom parts 20u, 20v of the first and second main channel 20a, 20b (but not necessarily a centered portion 112 of the bottom plate 110) protrude, in the x-direction, over the upper flange 50a. Then, in the overhanging portion of the first main channel 20a, a supply opening 20p is arranged, which is located directly above the first opening 44a such that the coolant supply channel 44 opens into the first main channel 20a to allow for a supply of the U-shaped channel system with a suitable coolant. In a similar manner, in the overhanging portion of the second main channel 20b, a discharge opening 20q is arranged, which is located directly above the second opening 46a such that second main channel 20b opens into the coolant discharge channel 46 to allow for discharging the coolant out of the U-shaped channel system.

The covered battery module can be assembled in an easy manner by simply putting a cell cooling cover in position (e.g., in a predefined position) on top of the battery module. Then, in the position, the coolant supply channel 44 is connected with the first main channel 20a and the coolant discharge channel 46 is connected with the second main channel 20b. To ensure fluid-tight connections, the edges of the first opening 44a and the second opening 46a may each be equipped with a circumferential gasket 44b, 46b. The circumferential gaskets 44b, 46b may slightly protrude in the z-direction. The circumferential gaskets 44b, 46b seal the connections of the coolant supply channel 44 with the first main channel 20a and the coolant discharge channel 46 with the second main channel 20b.

The battery module 800 may be accommodated in a housing. This is shown in, for example, FIGS. 4A, 4B, and 5, in which two side walls 8a, 8b from among a total number of four side walls of a housing 8 are visible. The housing 8 may also include a bottom wall (89; see, e.g., FIG. 6). To prevent undesired leakage of vent gases from the covered battery module through slits that possibly occur between the upper edges of the side walls 8a, 8b of the housing 8 and the cell cooling cover 100, the upper edges of each of the side walls may be equipped with respective gaskets to seal the side walls against the lower side of the cell cooling cover 100. If each of the side walls is sealed against the lower side of the cell cooling cover 100, the seal may be provided by one (continuous) circumferential gasket running along the upper edges of each of the side walls. A clamp 170 may be used to fix the gasket between the upper edges of the side walls 8a (8b) and the cover plate 120 (see, e.g., FIG. 6). The clamp 170 may be formed as one circumferential clamp running (or extending) around the housing 8 (e.g., running horizontally across each of the side walls of the housing 8).

Figure 5:
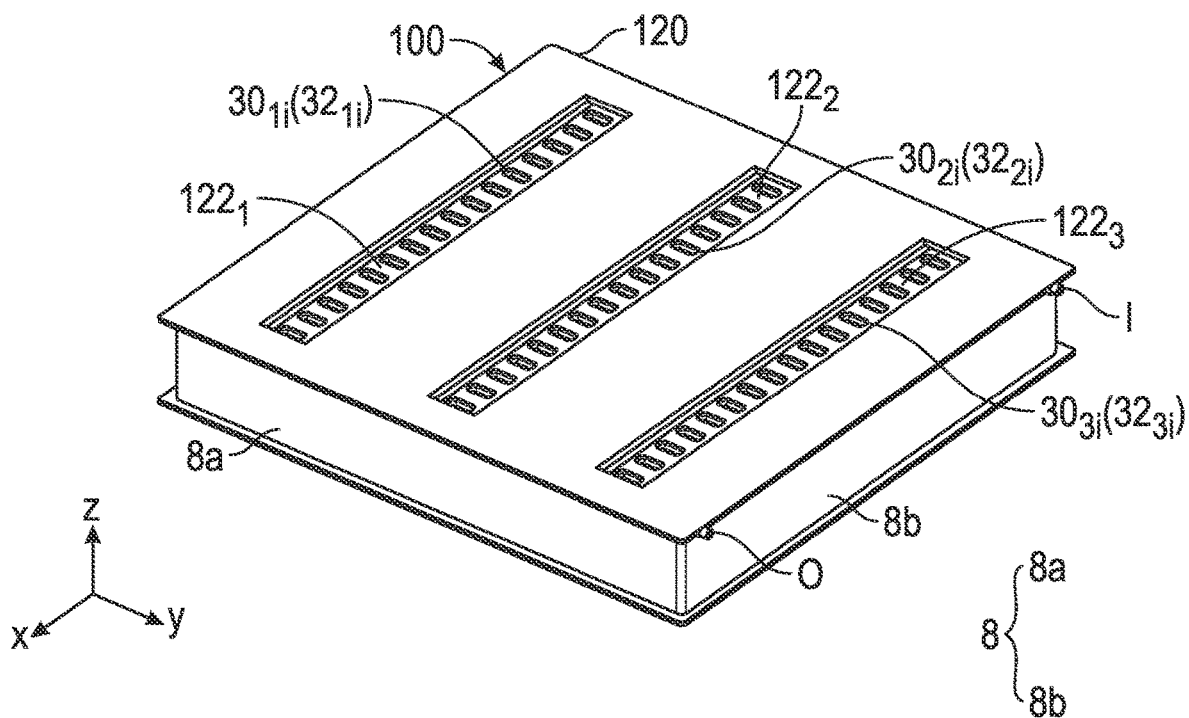
FIG. 5 is a schematic perspective view of the covered battery module shown in FIG. 4A.

In the embodiment shown in FIG. 5, one or more circumferential gaskets may be positioned between the cell cooling cover 100 (or a top wall 88) and the housing 8. In such embodiments, fluid connectors (e.g., an inlet I and an outlet O) are outside of the housing 8 to prevent contamination of the sealed area with cooling fluid in the event of connector leakage.

The only way for the vent gases to escape from the covered battery module 800 is to pass through the venting openings $30_{1i}$, $30_{2i}$, $30_{3i}$ provided in the cell cooling cover 100. In the embodiment described above with reference to FIGS. 1 to 3, one of the side walls may be formed by the end-plate 50 supporting the second end of the stack 810. Here, on top of the upper flange 50a and extending over the complete length of the latter parallel to the y-direction, a gasket 50c is arranged, which provides a seal between the upper flange 50a and the lower side of the cell cooling cover 100, where is placed in the position (shown in, e.g., FIG. 1C) on top of the battery module 800, which is, in this embodiment, provided as the single stack 810.

Figure 6:
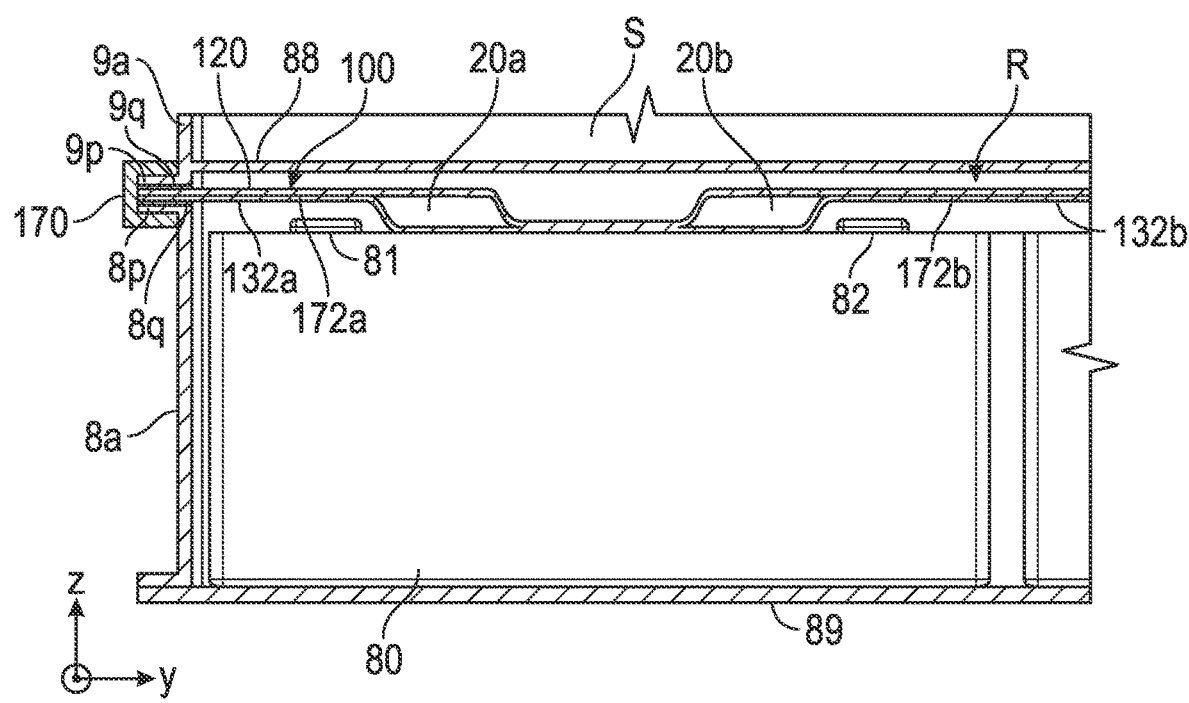
FIG. 6 schematically illustrates, in a cross-sectional view, a part of a battery pack in a cross-sectional view according to another embodiment of the present disclosure.

The complete covered battery module 800 as shown in FIG. 1A may be accommodated in a housing. Then, a top wall of the housing is arranged above the cell cooling cover 100. The housing may be separated in a gas-tight manner by the cell cooling cover 100 in the z-direction. Then, the space between the upper surface of the cell cooling cover 100 and the bottom surface of the top wall of the housing provides room for collecting vent gases ejected from the battery cells and having passed through the cell cooling cover 100. A similar configuration is shown in FIG. 6, which refers, however, to a battery pack including a plurality of battery modules piled along the z-direction. Normally, the vent gases do not leave a vent gas collecting room R. However, in serious cases/emergency cases, such as when a thermal run-away is occurring in one or more of the battery cells, large amounts of vent gases may be generated and subsequently ejected from the battery cells. In such a situation, the pressure of the vent gas collected in the vent gas collecting room R may become so large that there is a risk of deformation of the housing or even bursting of the housing. To avoid this, one or more burst elements can be arranged in the walls of the vent gas collecting room R. Also, one of the side walls of the battery collecting room R can be provided as a burst element. In the embodiment shown in FIG. 1A, a burst element 55 is realized on top of the overhanging front end (i.e., the end pointing into the x-direction) of the cell cooling cover 100. For example, the burst element 55 includes an upright part 55a configured for building a side wall of a vent gas collecting room established above the cell cooling cover 100 when the assembly shown in FIG. 1A is accommodated in a suitable housing. The burst element 55 is affixed such in the assembly, that in (emergency) cases when the pressure of the vent gas accumulated in the vent gas collecting room exceeds a reference (or predefined) value (e.g., a value in the range between about 0.1 to about 0.3 bar overpressure), the fixation of the burst element 55 comes loose and the burst element 55 is removed (or ejected) from the housing due to the gas pressure. Then, vent gas can escape from the vent gas collecting room R in a controlled manner.

Figure 4A:
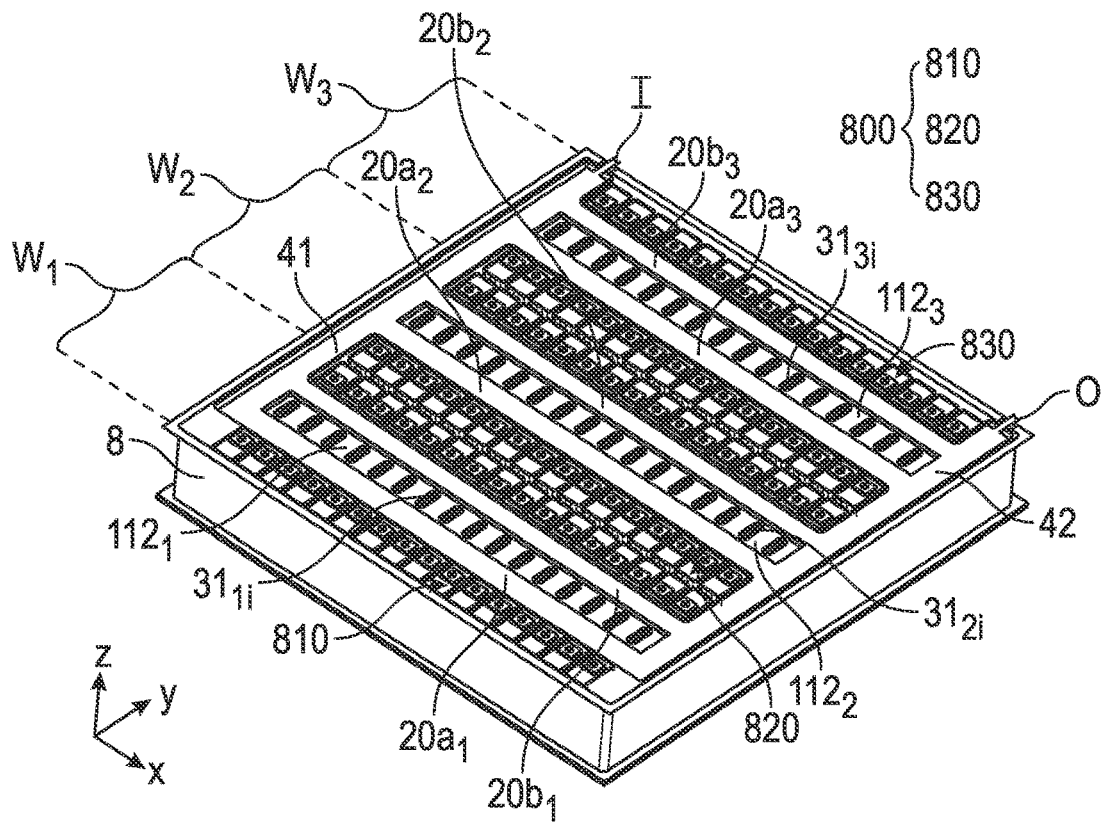
FIG. 4A is a schematic perspective view of parts of a covered battery module according to another embodiment of the present disclosure.
Figure 4B:
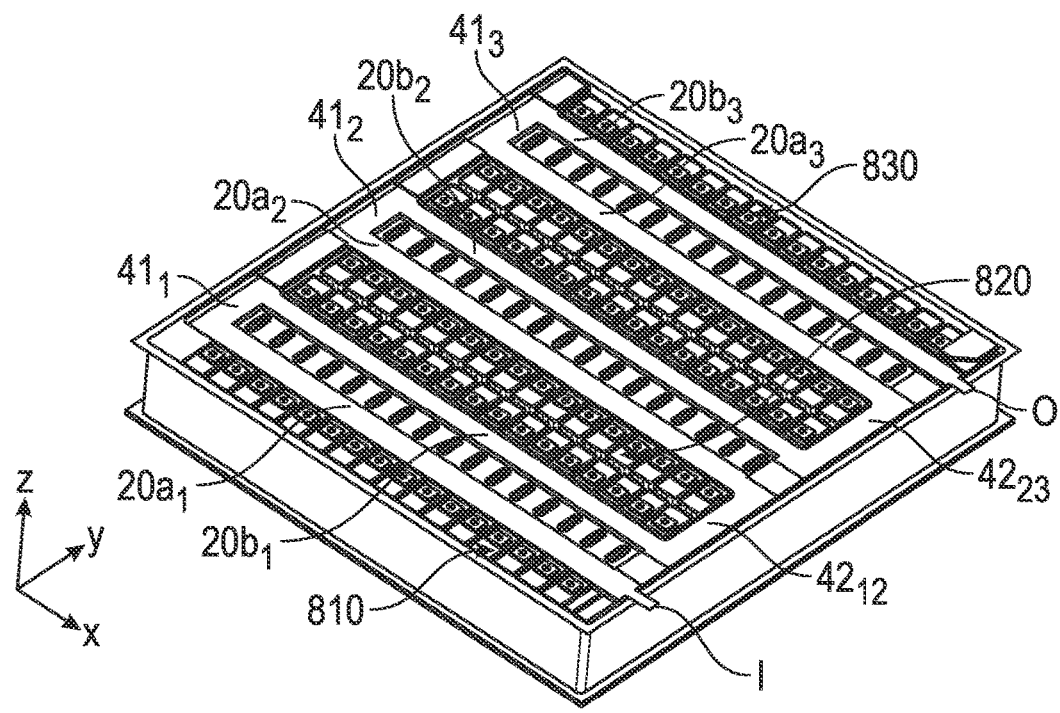
FIG. 4B is a schematic perspective view of parts of a covered battery module according to another embodiment the present disclosure.

In the embodiment of the covered battery module 800 shown in FIG. 1A, only one stack 810 of battery cells $80_1$, $80_i$, $80_N$ is included. However, in other embodiments of the covered battery module, a plurality of battery cell stacks may be used. This is depicted in FIGS. 4A and 4B, in which three stacks 810, 820, 830 of battery cells (each of which being orientated parallel to the x-direction) are arranged in parallel to each other along the y-direction to form a battery module 800. Thereby, with regard to the y-direction, a first stack 810 is arranged in an area $W_1$, a second stack 820 is arranged in an area $W_2$, and a third stack 830 is arranged in an area $W_3$. The areas $W_1$, $W_2$, and $W_3$ are indicated in FIG. 4A. In the illustrated embodiment, the three stacks 810, 820, 830 have an identical structure. For example, each of the stacks 810, 820, 830 include the same number N of battery cells and, in turn, the battery cells included in any one of the three stacks 810, 820, 830 have an identical structure. In other words, each of the stacks 810, 820, 830 of battery cells correspond to the stack 810 shown in FIG. 1A, except, however, for the features of the end-plate 50 and/or the burst element 55, which may be omitted in the embodiment shown in FIGS. 4A and 4B and may be replaced by different components. The cell cooling cover 100 is not part of the one or more stacks.

In the embodiment shown in FIG. 1A, the battery module 800 includes only a single stack 810 of battery cells. However, aspects and features of the present disclosure can be extended to a floor, as shown in FIGS. 4 and 5, showing an arrangement in which a plurality of stacks 810, 820, 830 are arranged in parallel and adjacent next to each other in the y-direction. Moreover, aspects and features of the present disclosure can be extended to a battery pack, in which a plurality of battery modules (each of which include one or more stacks of battery cells) are piled (or stacked) one above the other (e.g., in the z-direction with regard to the figures) to form a battery pack. This will be described in more detail below with reference to FIG. 6.

FIGS. 4A and 4B illustrate, in a perspective view, a bottom portion of a channel system employed in the cell cooling cover 100 according to different embodiments. Therefore, the guidance of the channels becomes visible in these figures. In either embodiment, for each of the stacks 810, 820, 830, pair of main channels is provided. For example, a first pair includes a first main channel $20a_1$ and a second main channel $20b_1$ provided such that the respective first main channel $20a_1$ and the respective second main channel $20b_1$ each are guided along each of the terminal sides of the first stack 810 in a similar manner as explained with reference to FIGS. 1 to 3. Correspondingly, a second pair includes a further first main channel $20a_2$ and a further second main channel $20b_2$ provided such that the respective first main channel $20a_2$ and the respective second main channel $20b_2$ of that second pair are each guided along each of the terminal sides of the second stack 820. Also, a third pair includes yet a further first main channel $20a_3$ and yet a further second main channel $20b_3$ provided such that the respective first main channel $20a_3$ and the respective second main channel $20b_3$ of that third pair are each guided along each of the terminal sides of the third stack 830.

The bottom portions of the main channels $20a_1$, $20b_1$ of the first pair are realized by a common first bottom plate, which also has a centered portion $112_1$ arranged between the main channels $20a_1$, $20b_1$ of the first pair. The centered portion $112_1$ has a plurality of first holes $31_{1i}$ arranged in a similar manner on the centered portion $112_1$ as described above with reference to FIG. 3. Correspondingly, the bottom portions of the main channels $20a_2$, $20b_2$ of the second pair are provided by a common second bottom plate, which also has a centered portion $112_2$ arranged between the main channels $20a_2$, $20b_2$ of the second pair. The centered portion $112_2$ has a plurality of first holes $31_{2i}$. The bottom portions of the main channels $20a_3$, $20b_3$ of the third pair are provide by a common third bottom plate, which also has a centered portion $112_3$ arranged between the main channels $20a_3$, $20b_3$ of the third pair. The centered portion $112_3$ has a plurality of first holes $31_{3i}$.

In the embodiment shown in FIG. 4A, each of the main channels $20a_1$, $20b_1$, $20a_2$, $20b_2$, $20a_3$, $20b_3$ is connected by a respective inlet of the respective main channel to a first connection channel 41 (only the bottom portions of the main channels are depicted in FIG. 4A). Thus, each of the main channels $20a_1$, $20b_1$, $20a_2$, $20b_2$, $20a_3$, $20b_3$ can be supplied with a coolant via the first connection channel 41. Similarly, each of the main channels $20a_1$, $20b_1$, $20a_2$, $20b_2$, $20a_3$, $20b_3$ is connected by a respective outlet of the respective main channel to a second connection channel 42. Accordingly, the coolant guided through the main channels can be discharged from each of the main channels $20a_1$, $20b_1$, $20a_2$, $20b_2$, $20a_3$, $20b_3$ into the second connection channel 42. For example, the main channels $20a_1$, $20b_1$, $20a_2$, $20b_2$, $20a_3$, $20b_3$ can be considered as being connected in parallel within the channel system of the embodiment shown in FIG. 4A. Thus, when the cell cooling cover according to this embodiment is operated by guiding a coolant through the channel system, the flow direction of the coolant is the same for each of the main channels $20a_1$, $20b_1$, $20a_2$, $20b_2$, $20a_3$, $20b_3$ (i.e., into the x-direction in the Figure). The first connection channel 41 can be supplied with the coolant via an inlet I arranged at one end of first connection channel 41, and correspondingly, coolant can be discharged from the second connection channel 42 via an outlet O arranged at one end of the second connection channel 42.

In the embodiment shown in FIG. 4B, the channels of the first pair of main channels $20a_1$, $20b_1$ are connected, at their respective rear ends (e.g., the ends pointing in the x-direction) with a first rear connection channel $41_1$ to form a U-shaped channel (sub-)system similar to the U-shaped channel system described above with reference to FIGS. 1 to 3. Similarly, the channels of the second pair of main channels $20a_2$, $20b_2$ are connected, at their respective rear ends with a second rear connection channel $41_2$ to form a further U-shaped channel (sub-)system. The channels of the third pair of main channels $20a_3$, $20b_3$ are connected, at their respective rear ends, with a third rear connection channel $41_3$ to form still a further U-shaped channel (sub-)system. Further, the front end (e.g., the end pointing into the x-direction) of the second main channel $20b_1$ of the first pair of channels is connected to the front end of the first main channel $20a_2$ of the second pair of channels by a front connection channel $42_{12}$. Similarly, the front end of the second main channel $20b_2$ of the second pair is connected to the front end of the first main channel $20a_3$ of the third pair of channels by a further front connection channel $42_{23}$. Accordingly, the channel system including each of the main channels and each of the connection channels as illustrated in FIG. 4B has a meandering shape. To supply the channel system with a coolant, an inlet I is arranged at the front and of first main channel $20a_1$ of the first pair. Also, to discharge the coolant from the channel system, an outlet O is arranged at the front end of the second main channel $20b_3$ of the third pair. Hence, the main channels $20a_1$, $20b_1$, $20a_2$, $20b_2$, $20a_3$, $20b_3$ can be considered as being connected in series within the channel system of the embodiment shown in FIG. 4B. Accordingly, when the cell cooling cover according to this embodiment is operated by guiding a coolant through the channel system, the coolant in each of the first main channels $20a_1$, $20a_2$, $20a_3$ flows against the x-direction, and the coolant in each of the second main channels $20b_1$, $20b_2$, $20b_3$ flows into the x-direction.

Of course, in each of the embodiments described above with reference to FIGS. 4A and 4B, the flow directions of the coolant and any point within the channel system can be reversed by using the inlet I of the channel system as an outlet and using the outlet O of channel system as an inlet. Typically, the functioning of the cell cooling cover 100 and its cooling effect on the battery module 800 arranged below is not affected by such a reversed operation.

The bottom portion of the channel systems as depicted in FIGS. 4A and 4B is, in some embodiments, provided as one member (e.g., is integrally formed). For example, this member may be formed from one piece of material. In some embodiments, each of the channels in the channel system may be covered by an individual top plate to form a tube or pipe. In some embodiments, each of the pairs of main channels provided for the three stacks 810, 820, 830 may include an individual cover plate as a top part (or a top portion), which may be arranged as described above in the context of FIGS. 1 to 3. In some embodiments, however, the top part of each of the channels is formed by a single cover plate 120, as shown in, for example, FIG. 5 (note that the view of the covered battery module as depicted in FIG. 5 is rotated by 90° with respect to the vertical axis in comparison to FIG. 4A). Above each of the first holes $31_{1i}$, $31_{2i}$, $31_{3i}$ provided in the centered portions $112_1$, $112_2$, $113_3$ of the bottom plates shown in FIG. 4A, a respective second hole $32_{1i}$, $32_{2i}$, $32_{3i}$ is arranged in the cover plate 120 such that each pair of the first hole $31_{1i}$, $31_{2i}$, $31_{3i}$ and the respective second hole $32_{1i}$, $32_{2i}$, $32_{3i}$ together forms a venting opening $30_{1i}$, $30_{2i}$, $30_{3i}$ through which vent gas may pass through the cell cooling cover 100. After having passed the cell cooling cover 100 via the respective venting openings $30_{1i}$, $30_{2i}$, $30_{3i}$, the vent gas may be collected in a vent gas collecting room R provided above the cell cooling cover 100 as illustrated in FIG. 6. The function of the vent gas collecting room has already been explained above with reference to FIG. 1A.

However, in some embodiments, a plurality of covered battery modules may be arranged one above the other to form a battery pack of piled (or stacked) covered battery modules. For example, a plurality of covered battery module as illustrated in FIG. 5 may be piled one on top of the other. FIG. 6 shows a cross-sectional view, which shown such an alignment in the z-direction. As can be seen, a separate room (which may be equipped with a burst element on an arbitrary wall position) for the venting gas, and therefore, the electric circuitry is not contaminated.

In such a battery pack, the top wall 88 for the vent gas collecting room R provided on top of the cell cooling cover 100 may act as a bottom wall for supporting a further battery module arranged above the cell cooling cover 100 (and the respective vent gas collecting room R) in that pile. This is indicated in FIG. 6 by the space S provided to accommodate a further battery module. Also, further stacks of battery cells may be arranged on the right side (with regard to FIG. 6) of the battery cell 80 in FIG. 6. In such a battery pack, above each of the individual covered battery modules, a respective vent gas collecting room R may be provided. Each of these vent gas collecting rooms may include an individual burst element. However, in some embodiments, the individual vent gas collecting rooms R may be connected to each other (e.g., by suitable channels). Then, it is sufficient that only one of these vent gas collecting rooms includes a burst element.

With respect to the battery pack as illustrated in FIG. 6, a first floor for accommodating a battery module is provided between a bottom wall 89 and the cell cooling cover 100, and a second floor for accommodating a further battery module is given by the space S. Accordingly, with respect to FIG. 6, the housing includes a first side wall 8a confining the first floor and a second side wall 9a confining the second floor. The first side wall 8a of the first floor includes, at its upper edge, a first protrusion 8p directed into the outside of the housing, and, correspondingly, the second side wall 9a of the second floor includes, at its lower edge, a second protrusion 9p directed into the outside of the housing. The cover plate 120 of the cell cooling cover 100 and the first cantilever 132a are arranged between the first and second protrusions 8p, 9p. However, between the first protrusion 8p and the first cantilever 132a, a lower gasket 8q is inserted, and between the second protrusion 9p and the cover plate 120, an upper gasket 9q is inserted. Further, between the cover plate 120 and the first cantilever 132a, the gasket 172a is inserted. The clamp 170 encompasses the first and second protrusions 8p, 9p and presses the first and second protrusions 8p, 9p together along the z-direction. Hence, the arrangement between the first and second protrusions (i.e., the lower gasket 8q, the first cantilever 132a, the gasket 172a, the cover plate 120, and the upper gasket 9q) is pressed onto each other. Thus, by the force of the clamp 170, the upper edge of the first side wall 8a is sealed against the first cantilever 132a by the lower gasket 8q, and the lower edge of the second side wall 9a is sealed against the cover plate 120 by the upper gasket 9q. Furthermore, the cover plate 120 is sealed against the first cantilever 132a by the gasket 172a.

SOME REFERENCE SIGNS 8 housing
8a, 8b side walls of housing
8q lower gasket
9a side wall
9q upper gasket
20a, $20a_1$, $20a_2$, $20a_3$ first (main) channel
20b, $20b_1$, $20b_2$, $20b_3$ second (main) channel
20u bottom part of first main channel
20v bottom part of second main channel
20p supply opening in first main channel
20q discharge opening in second main channel
30, $30_1$, $30_i$, $30_N$ venting opening
$31_1$, $31_i$, $31_N$ first hole
$31_{1i}$, $31_{2i}$, $31_{3i}$ first hole
$32_1$, $32_i$, $32_N$ second hole
$32_{1i}$, $32_{2i}$, $32_{3i}$ second hole
40 connection channel
41, $41_1$, $41_2$, $41_3$ first connection channel
42, $41_{12}$, $41_{23}$ second connection channel
44 coolant supply channel
44a first opening in upper flange
44b circumferential gasket
46 coolant discharge channel
46a second opening in upper flange
46b circumferential gasket
50 side wall
50a upper flange
50b lower flange
50c gasket
55 burst element
55a part of burst element
80, $80_1$, $80_i$, $80_N$ battery cell
80a interior of a battery cell
81, $81_1$, $81_i$, $81_N$ first terminal
82, $82_1$, $82_i$, $82_N$ second terminal
83, $83_1$, $83_i$, $83_N$ venting outlet
84, $84_1$, $84_i$, $84_N$ terminal side
85a, 85b side walls of a battery cell
88 top wall
89 bottom wall
100 cell cooling cover
110 bottom plate
112, $112_1$, $112_2$, $112_3$ centered portion of bottom plate
120 cover plate
122, $122_1$, $122_2$, $122_3$ indentation
122a first indentation side part
122b second indentation side part
122c third indentation side part
130a first side part
130b second side part
130c connection channel side part
132a first cantilever
132b second cantilever
172a, 172b gaskets
600 room
800 battery module
810, 820, 830 stack of battery cells
A, B, C areas
Δ distance I inlet of channel system
O outlet of channel system
R vent gas collecting room
S space for accommodating a battery module
$W_1$, $W_2$, $W_3$ areas
x, y, z directions of a Cartesian coordinate system

What is claimed is:

1. A cell cooling cover for covering and fluid-cooling a battery module, the battery module comprises a stack of battery cells, each of the battery cells has a first side having a planar shape facing in the same direction, extending along one virtual plane, each of the battery cells comprising and having a venting outlet and a plurality of terminals in the first side thereof, the cell cooling cover comprising:
    a cover plate configured to cover the first sides of the battery cells of the battery module including the terminals in the first side thereof when the cell cooling cover is brought into a first position relative to the battery module; and
    a channel system fixedly arranged at the cover plate, the channel system comprises a plurality of main channels, each of the main channels being configured to guide a coolant,
    wherein the main channels are arranged such that, when the cell cooling cover is in the first position relative to the battery module, the main channels extend each along the stack, and, when viewed in a direction perpendicular to the first sides, the main channels are each positioned in an area of the first sides of the battery cells, and the venting outlets of the battery cells are each entirely arranged in an area between the main channels.

2. The cell cooling cover according to claim 1, wherein, for each of the battery cells, the first side is a terminal side,
    wherein the plurality of terminals comprises a first terminal and a second terminal is on each of the terminal sides,
    wherein, for each of the battery cells, the venting outlet is arranged between the first terminal and the second terminal, and
    wherein a first main channel of the main channels extends between the first terminals of the battery cells and the venting outlets of the battery cells, and
    wherein a second main channel of the main channels extends between the venting outlets of the battery cells and the second terminals of the battery cells.

3. The cell cooling cover according to claim 2,
    wherein the cell cooling cover has a plurality of venting openings, each of the venting openings being configured to pass a vent gas through the cell cooling cover; and
    wherein the venting openings are arranged in the cell cooling cover such that at least some of the venting openings are aligned with one of the venting outlets when viewed in a direction perpendicular to the first sides.

4. The cell cooling cover according to claim 3,
    wherein each of the main channels comprises a bottom part and a top part; and
    wherein the top part of each of the main channels is formed by the cover plate, and
    wherein the bottom part of each of the main channels is formed by a bottom plate.

5. The cell cooling cover according to claim 4, wherein, the battery module comprises a plurality of the stacks of battery cells and one bottom plate is provided for each of the stacks of battery cells, the bottom plate being configured to be placed on each of the first sides of the battery cells.

6. The cell cooling cover according to claim 5, the bottom plate is configured to be placed between the first terminals and the second terminals of the battery cells,
    wherein each of the bottom plates has a first edge adjacent to the first terminals of the battery cells, and
    wherein each of the bottom plates has a second edge adjacent to the second terminals of the battery cells.

7. The cell cooling cover according to claim 6, wherein each of the bottom plates comprises a first side part and a second side part,
    wherein the first side part extends between the cover plate and the first edge of the bottom plate, and
    wherein the second side part extends between the cover plate and the second edge of the bottom plate.

8. The cell cooling cover according to claim 1, wherein a first main channel and a second main channel of the main channels are connected to each other by a connection channel, and
    wherein the first main channel, the connection channel, and the second main channel together form a U-shaped channel.

9. The cell cooling cover of claim 8, wherein the channel system comprises a first connection channel and a second connection channel, and
    wherein each of the first and second main channels is connected with the first connection channel and the second connection channel.

10. The cell cooling cover according to claim 9, wherein a side of the cell cooling cover configured to face the battery cells comprises an electrical insulation layer.

11. A covered battery module comprising:
    a cell cooling cover according to claim 1; and
    a battery module comprising a stack of battery cells, each of the battery cells has a first side having a planar shape, facing in the same direction and extending along one virtual plane, and having a venting outlet,
    wherein the cell cooling cover is positioned on the battery module in the first position relative to the battery module.

12. The covered battery module according to claim 11,
    wherein the battery module further comprises a coolant supply channel and a coolant discharge channel, and
    wherein an inlet of the channel system is connected with the coolant supply channel, and an outlet of the channel system is connected with the coolant discharge channel.

13. The covered battery module according to claim 11, wherein the battery module has side walls extending perpendicular to the first sides of the battery cells, and
    wherein a seal is between some of the side walls and the cell cooling cover.

14. A battery pack comprising a plurality of covered battery modules according to claim 11, wherein the covered battery modules are arranged as a pile in that, except for a first one of the covered battery modules forming a base of the pile, each of the covered battery modules is arranged on a cell cooling cover of another one of the covered battery modules.

15. A vehicle comprising the battery pack according to claim 14.

16. A vehicle comprising the covered battery module according to claim 11.

17. The cell cooling cover according to claim 1, wherein the main channels respectively contact the first side of each of the battery cells at an area between one end of the first side and the venting outlet and the opposite end of the first side and venting outlet.

18. The cell cooling cover according to claim 17, wherein the main channels respectively contact the first side of each of the battery cells at an area between one of the terminals and the venting outlet and another one of the terminals and venting outlet.

\* \* \* \* \*